US012643457B2

(12) United States Patent
Nelson et al.

(10) Patent No.: US 12,643,457 B2
(45) Date of Patent: Jun. 2, 2026

(54) DIVIDER PANEL SYSTEMS AND METHODS FOR THEIR MANUFACTURING AND INSTALLATION

(71) Applicant: FG Products, Inc., Rice Lake, WI (US)

(72) Inventors: Chad Nelson, Rice Lake, WI (US); Matthew Nelson, Cameron, WI (US)

(73) Assignee: FG Products, Inc., Rice Lake, WI (US)

( * ) Notice: Subject to any disclaimer, the term of this patent is extended or adjusted under 35 U.S.C. 154(b) by 177 days.

(21) Appl. No.: 18/521,385

(22) Filed: Nov. 28, 2023

(65) Prior Publication Data

US 2024/0092246 A1　Mar. 21, 2024

Related U.S. Application Data

(63) Continuation of application No. 17/959,877, filed on Oct. 4, 2022, now abandoned, which is a continuation (Continued)

(51) Int. Cl.
　B60P 3/20　　　(2006.01)
　B32B 3/06　　　(2006.01)
　(Continued)

(52) U.S. Cl.
　CPC ............... B60P 3/205 (2013.01); B32B 3/06 (2013.01); B32B 5/18 (2013.01); B32B 27/065 (2013.01);
　(Continued)

(58) Field of Classification Search
　CPC ........... B32B 27/302; B32B 7/12; B32B 3/18; B32B 27/32; B32B 5/245; B32B 5/18;
　(Continued)

(56) References Cited

U.S. PATENT DOCUMENTS 1,818,404 A 8/1931 Kaufman
2,021,922 A 11/1935 Peck
(Continued)

FOREIGN PATENT DOCUMENTS

CA 2019852 12/1990
FR 761591 3/1934
GB 2261382 5/1993

OTHER PUBLICATIONS

"An Overview of the Insulated Bulkhead" <https://www.fgproducts. com/insulated-bulkheads/overview/>, 2017 (previously cited and submitted in related U.S. Appl. No. 16/152,161) (previously cited and submitted in related U.S. Appl. No. 16/152,161).

(Continued)

*Primary Examiner* — Chi Q Nguyen
(74) *Attorney, Agent, or Firm* — Gardella Alciati

(57) ABSTRACT

An apparatus for attachment to a panel configured for partitioning a trailer cargo space includes a member having a cross-section with a concave receiver section including a laterally extending support section connected to sidewalls extending perpendicular to the support section, the receiver section dimensioned for attaching the member along a panel edge with sidewalls engaged against opposite sides of the panel and the support section contacting the panel edge, and first engagement feature(s) disposed opposite and extending along an edge surface of the panel assembly, and a first stacking plate including a first side having feature(s) complementary to the first engagement feature(s), such that the member and the first stacking plate engagingly mate, and an opposite side with second engagement feature(s) similar to the first engagement feature(s), such that the first stacking plate engagingly mates with a second stacking plate.

19 Claims, 20 Drawing Sheets

Related U.S. Application Data of application No. 16/152,161, filed on Oct. 4, 2018, now Pat. No. 11,479,158.

(60) Provisional application No. 62/568,143, filed on Oct. 4, 2017.

(51) Int. Cl.

| | |
|---|---|
| *B32B 5/18* | (2006.01) |
| *B32B 27/06* | (2006.01) |
| *B32B 27/12* | (2006.01) |
| *B32B 27/30* | (2006.01) |
| *B32B 27/32* | (2006.01) |
| *B60J 10/74* | (2016.01) |
| *B60J 10/76* | (2016.01) |
| *B62D 33/04* | (2006.01) |
| *B62D 63/08* | (2006.01) |

(52) U.S. Cl.
    CPC ............ *B32B 27/12* (2013.01); *B32B 27/302* (2013.01); *B32B 27/32* (2013.01); *B60J 10/74* (2016.02); *B60J 10/76* (2016.02); *B62D 33/042* (2013.01); *B62D 33/048* (2013.01); *B32B 2250/03* (2013.01); *B32B 2250/40* (2013.01); *B32B 2262/101* (2013.01); *B32B 2266/0228* (2013.01); *B32B 2266/025* (2013.01); *B32B 2307/304* (2013.01); *B32B 2605/00* (2013.01); *B62D 63/08* (2013.01)

(58) Field of Classification Search
    CPC .... B32B 3/02; B32B 3/06; B32B 3/08; B32B 27/30; B32B 27/065; B32B 3/30; B32B 15/046; B32B 27/08; B32B 15/082; B32B 15/085; B32B 27/12; B32B 5/02; B32B 15/14; B32B 5/26; B32B 15/043; B32B 5/20; B32B 2260/046; B32B 2250/40; B32B 2605/00; B32B 2307/304; B32B 2262/106; B32B 2260/021; B32B 2262/101; B32B 2266/0228; B32B 2605/003; B32B 2250/03; B32B 2266/025; B60B 3/205; B60J 10/76; B60J 10/74; B62D 33/048; B62D 33/042; B62D 63/08

See application file for complete search history.

(56) References Cited

U.S. PATENT DOCUMENTS

| | | | |
|---|---|---|---|
| 2,115,936 A | | 5/1938 | Sterns |
| 2,257,001 A | | 9/1941 | Davis |
| 4,236,366 A | | 12/1980 | Rijnders |
| 4,375,829 A | | 3/1983 | Dorr et al. |
| 4,435,935 A | | 3/1984 | Larrea |
| 5,005,333 A | | 4/1991 | Ott |
| 5,010,943 A | | 4/1991 | Boyer |
| 5,054,668 A | * | 10/1991 | Ricchiuti ................. B60R 7/02 224/311 |
| 5,161,848 A | | 11/1992 | Lutton |
| 5,350,331 A | | 9/1994 | Glickman |
| 5,536,561 A | | 7/1996 | Turi et al. |
| 6,626,625 B2 | | 9/2003 | Nelson et al. |
| 6,681,820 B2 | | 1/2004 | Olofsson |
| 8,087,859 B2 | | 1/2012 | Nelson |
| 8,491,035 B1 | * | 7/2013 | Pfaff ................... B62D 35/001 296/180.1 |
| 9,175,508 B1 | | 11/2015 | Steele |
| 10,507,875 B1 | * | 12/2019 | Ebnöther ................ B32B 15/18 |
| 11,220,302 B2 | * | 1/2022 | Schellekens ......... B62D 35/001 |
| 12,065,305 B2 | * | 8/2024 | Mun ......................... B60P 7/14 |
| 12,110,066 B1 | * | 10/2024 | Magee ................. B62D 35/001 |
| 2002/0108725 A1 | | 8/2002 | Nelson |
| 2010/0183398 A1 | | 7/2010 | Nelson |
| 2016/0069787 A1 | * | 3/2016 | Mocnik ............... G01N 21/274 356/433 |
| 2016/0368544 A1 | * | 12/2016 | Heilaneh .............. B62D 35/001 |
| 2019/0100126 A1 | * | 4/2019 | Nelson ................. B32B 27/302 |
| 2019/0119918 A1 | | 4/2019 | Kelly |
| 2019/0145101 A1 | | 5/2019 | Costanza |
| 2022/0348427 A1 | * | 11/2022 | Bell ........................ B62D 33/02 |
| 2024/0172719 A1 | * | 5/2024 | Plazek ................ A01K 1/0029 |
| 2024/0284865 A1 | * | 8/2024 | Heath .................. A01K 1/0035 |

OTHER PUBLICATIONS

Center Partition Systems, FG Products, Inc., 2010. (previously cited and submitted in related U.S. Appl. No. 16/152,161).

CubeSaver—Track Mounted Bulkhead, FG Products, Inc., 2010 (previously cited and submitted in related U.S. Appl. No. 16/152,161).

SmarTrack Insulated Bulkhead, FG Products, Inc., 2015 (previously cited and submitted in related U.S. Appl. No. 16/152,161).

Contract Trailer Equipment Guide, C.H. Robinson, 2017 (previously cited and submitted in related U.S. Appl. No. 16/152,161).

Non-Final Office Action dated Mar. 3, 2022, mailed in related U.S. Appl. No. 16/152,161 (previously cited and submitted in related U.S. Appl. No. 17/959,877).

Notice of Allowance dated Jun. 13, 2022, mailed in related U.S. Appl. No. 16/152,161 (previously cited and submitted in related U.S. Appl. No. 17/959,877).

\* cited by examiner

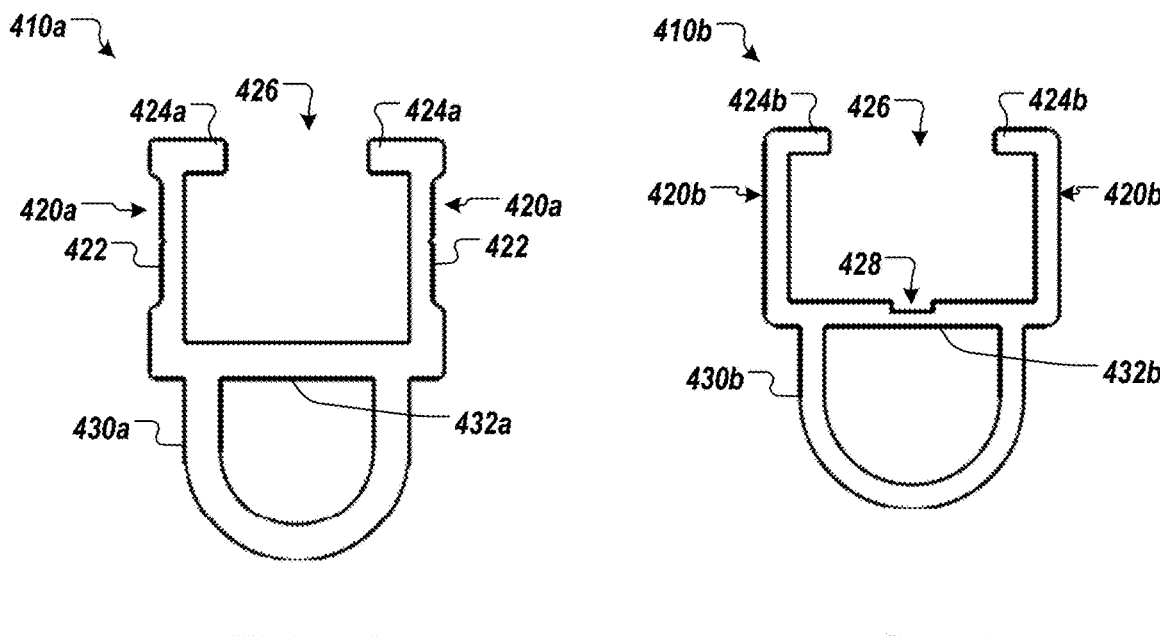
FIG. 4A                    FIG. 4B
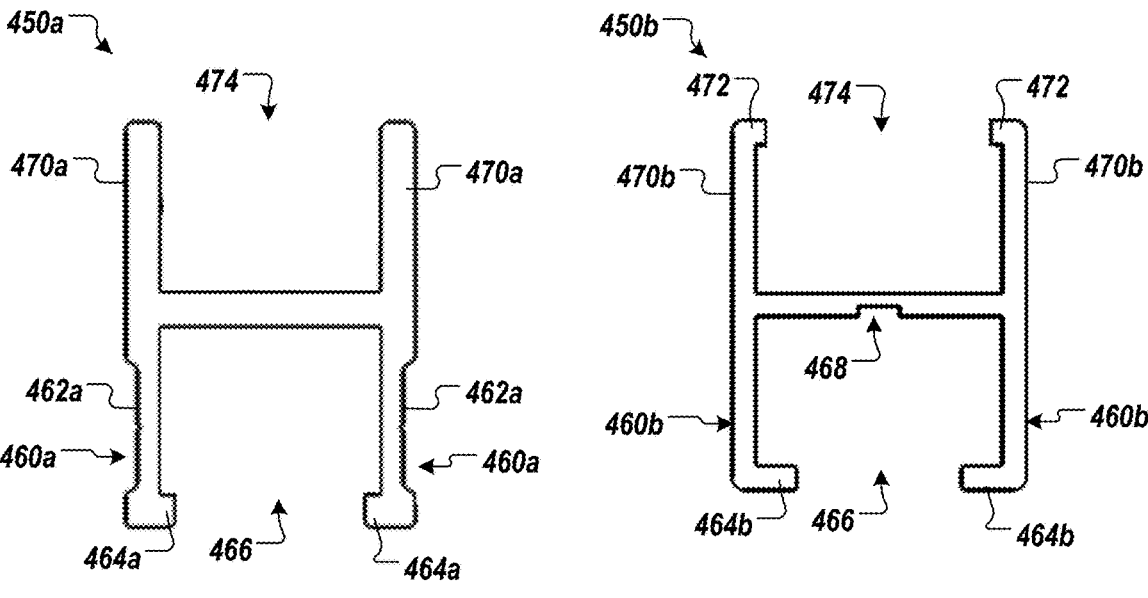
FIG. 4C                    FIG. 4D

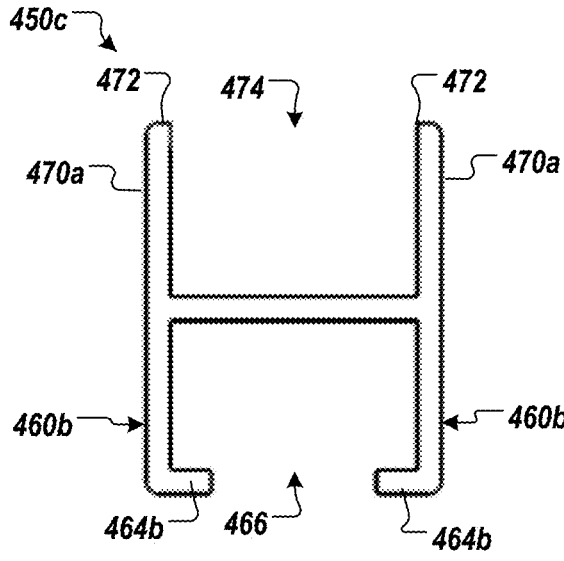
FIG. 4E
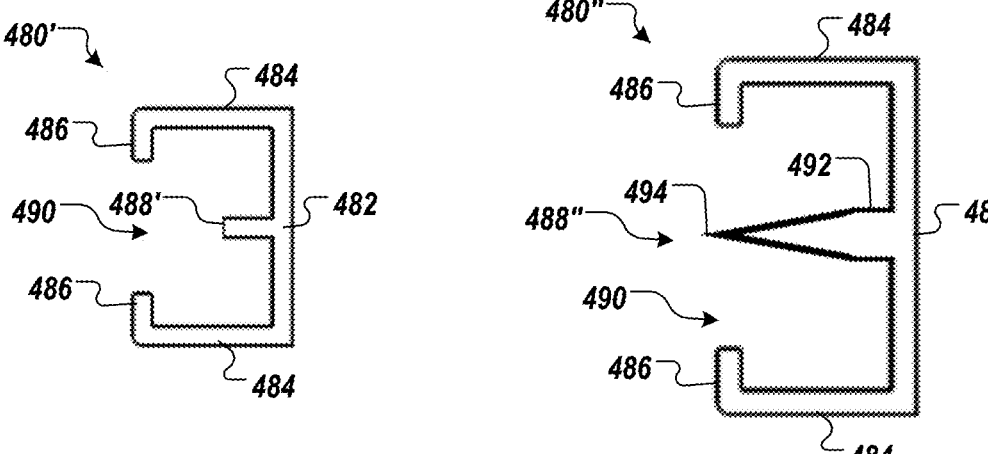
FIG. 4F                    FIG. 4G

_510_

_512_

_514_

_516_

<u>802</u>

822

Providing a first panel skin and a second panel skin, where each skin has a shape forming at least one cut line and a pair of grooves adjacent to the at least one cut line

824

Forming a panel shell by bonding a portion of the first panel skin to the second panel skin

826

Injecting the panel shell with a filler material

828

Conditioning the panel with a finishing treatment

_804_

830

Providing a first panel skin and a second panel skin

832

Forming an assembly of the first panel skin and the second panel skin

834

Placing the assembly into a mold having a shape configured to symmetrically form at least one cut line and a pair of grooves adjacent to cut line in each of the first panel skin and the second panel skin

836

Compressing the mold to the assembly, thereby causing bonding of a portion of the first panel skin and the second panel skin and formation of the cut lines into the assembly and a hollow core between the skins

838

Injecting the hollow core with filler material

840

Conditioning the panel with a finishing treatment

DIVIDER PANEL SYSTEMS AND METHODS FOR THEIR MANUFACTURING AND INSTALLATION

RELATED APPLICATIONS

This application is a continuation of and claims priority to U.S. patent application Ser. No. 17/959,877, entitled "Divider Panel Systems and Methods for Their Manufacturing and Installation," filed Oct. 4, 2022, which is a continuation of and claims priority to U.S. patent application Ser. No. 16/152,161, entitled "Divider Panel Systems and Methods for Their Manufacturing and Installation," filed Oct. 4, 2018 (now U.S. Pat. No. 11,479,158), which claims priority to U.S. Provisional Patent Application Ser. No. 62/568,143, entitled "Divider Panel Systems and Methods for Installation," filed Oct. 4, 2017. This application is related to U.S. Pat. No. 8,087,859 entitled "Systems and Methods for Separating Cargo Spaces" and issued Jan. 3, 2012. Each above identified application and patent is hereby incorporated by reference in its entirety.

BACKGROUND

Temperature-controlled cargo containers, such as refrigerated trailers, are commonly used to transport food products and other temperature-sensitive products. A refrigerated trailer generally includes a refrigeration unit mounted to the front wall of the trailer with inlet and outlet portions protruding into the interior of the trailer. The outlet of the refrigeration unit forces cooled air into the trailer near the ceiling of the trailer, thus causing the cooled air to cycle through the trailer. The inlet of the refrigeration unit is positioned to receive air that has cycled into the trailer. Refrigerated trailers are typically configured so as to define a single enclosed space. When the temperature-sensitive cargo does not fill the entire trailer space, cooling the entire space can be inefficient.

In some circumstances, longitudinal partition panels can be employed to divide the trailer space into longitudinal zones of selected sizes. For example, one longitudinal zone can be used to store frozen cargo while another longitudinal zone can be used to store fresh produce. The longitudinal partitions panels may be manufactured to a predetermined height so as to mate with a particular floor-to-ceiling height of a trailer. If, however, the trailer has a floor-to-ceiling height that is slightly different (e.g., due to manufacturing tolerances or other factors) the longitudinal partition panels may not fit properly within the trailer.

SUMMARY OF ILLUSTRATIVE EMBODIMENTS

The forgoing general description of the illustrative implementations and the following detailed description thereof are merely exemplary aspects of the teachings of this disclosure and are not restrictive.

In an illustrative embodiment, an insulated panel for partitioning a trailer cargo space is provided including: a longitudinal bottom edge having a connecting edge; a first side vertical edge having a connecting edge; a second side vertical edge having a connecting edge; and one or more vertical cut lines spaced apart from at least one of the first side vertical edge and the second side vertical edge, where, when each cut line is cleaved, the cleaved cut line is configured to form a new second side vertical edge having a connecting edge.

In an illustrative embodiment, each cut line is spaced apart having a predetermined spacing, and when each cut line is cleaved, the panel is configured to have at least one of a new predetermined width and a new predetermined height.

In an illustrative embodiment, the predetermined spacing is in increments of at least one of 6", 9", and 12".

In an illustrative embodiment, each connecting edge includes a groove on each side of the panel, where the grooves are configured to secure the panel to a complementary mating extrusion.

In an illustrative embodiment, the panel further includes a first groove proximate each cut line towards the first side vertical edge and a second groove proximate the cut line towards the second side vertical edge.

In an illustrative embodiment, the panel includes a first panel skin, a second panel skin, and a foam core disposed between the first panel skin and the second panel skin.

In an illustrative embodiment, at least one of the first panel skin and the second panel skin is shaped to form one or more recesses for handling the panel.

In an illustrative embodiment, the insulated panel further includes one or more reinforcement layers disposed in between the at least one of the first panel skin and the second panel skin and the foam core.

In an illustrative embodiment, the one or more reinforcement layers are configured to reinforce the one or more recesses for handling the panel.

In an illustrative embodiment, the one or more reinforcement layers are configured to reinforce the connecting edge.

In an illustrative embodiment, the one or more reinforcement layers are configured to reinforce a groove on each side of the panel.

In an illustrative embodiment, a panel assembly for partitioning a trailer cargo space is provided including a first insulated panel and a second insulated panel, each insulated panel including a longitudinal bottom edge having a connecting edge, a first side vertical edge having a connecting edge, a second side vertical edge having a connecting edge, and one or more vertical cut lines spaced apart from one another proximate the first side vertical edge, where, when each cut line is cleaved, the cleaved cut line is configured to form a new second side vertical edge having a connecting edge; a first vertical mating extrusion configured to secure with a second side vertical edge of the first insulated panel; and a second vertical mating extrusion configured to secure with a first side vertical edge of the second insulated panel, where, when the first vertical mating extrusion is secured to the second vertical mating extrusion, the first insulated panel and the second insulated panel form an insulated wall.

In an illustrative embodiment, each connecting edge includes a groove on each side of each insulated panel, and each groove is configured to secure to a complementary guide on each mating extrusion.

In an illustrative embodiment, each complementary guide on each mating extrusion has at least one of a unique thickness and a length configured to complement each groove.

In an illustrative embodiment, the panel assembly further includes a bottom extrusion having two walls forming an opening configured to secure the longitudinal bottom edge of the panel to the trailer; where a height of the panel assembly is adjusted.

In an illustrative embodiment, each wall of the bottom extrusion has a guide configured to fit into a groove of a connecting edge along a longitudinal top edge of the panel.

In an illustrative embodiment, the panel assembly further includes a top extrusion configured to secure a top edge of the panel to a trailer bulkhead; where a height of the panel assembly is adjusted.

In an illustrative embodiment, the top extrusion includes a top frame connected to a bottom frame by a support, a pair of lateral extensions, each lateral extension extending from a lateral side of the bottom frame, a mounting leg extending down from each lateral extension, and a flexible sealing flap positioned on top of each lateral extension and extending outward from each lateral extension.

In an illustrative embodiment, a method for forming a panel having one or more cut lines is provided including: providing a first panel skin, a second panel skin, and a foam core; forming an assembly of the foam core in between the first panel skin and the second panel skin; placing the assembly into a mold having a shape configured to form a longitudinal bottom edge having a connecting edge, a first side vertical edge having a connecting edge, a second side vertical edge having a connecting edge, one or more vertical cut lines spaced apart from one another proximate the first side vertical edge, and one or more grooves adjacent to the one or more vertical cut lines in each of the first panel skin and the second panel skin; and compressing the mold to the assembly causing formation of the one or more cut lines, the one or more grooves, and the connecting edges into the assembly.

In an illustrative embodiment, a method further includes: providing one or more reinforcement layers; and placing the one or more reinforcement layers in the assembly.

In an illustrative embodiment, a method for forming a panel having one or more cut lines includes providing a first panel skin and a second panel skin, where each panel skin has a shape forming at least one cut line and a pair of grooves adjacent to the at least one cut line, forming a panel shell by bonding a portion of the first panel skin to the second panel skin, and injecting the panel shell with a filler material.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 4A is a drawing of a cross section of a bull shaped extrusion having a tapered wall according to an example;

FIG. 4B is a drawing of a cross section of a bull shaped extrusion having a notch according to an example;

FIG. 4C is a drawing of a cross section of an H-shaped extrusion having a tapered wall according to an example;

FIG. 4D is a drawing of a cross section of an H-shaped extrusion having a notch according to an example;

FIG. 4E is a drawing of a cross section of another H-shaped extrusion according to an example;

FIGS. 4F-4G are drawings of cross sections of assembly extrusions according to an example;

FIGS. 8A-8D are exemplary flowcharts of methods for forming a panel having one or more cut lines;

DETAILED DESCRIPTION OF ILLUSTRATIVE EMBODIMENTS

Figure 1:
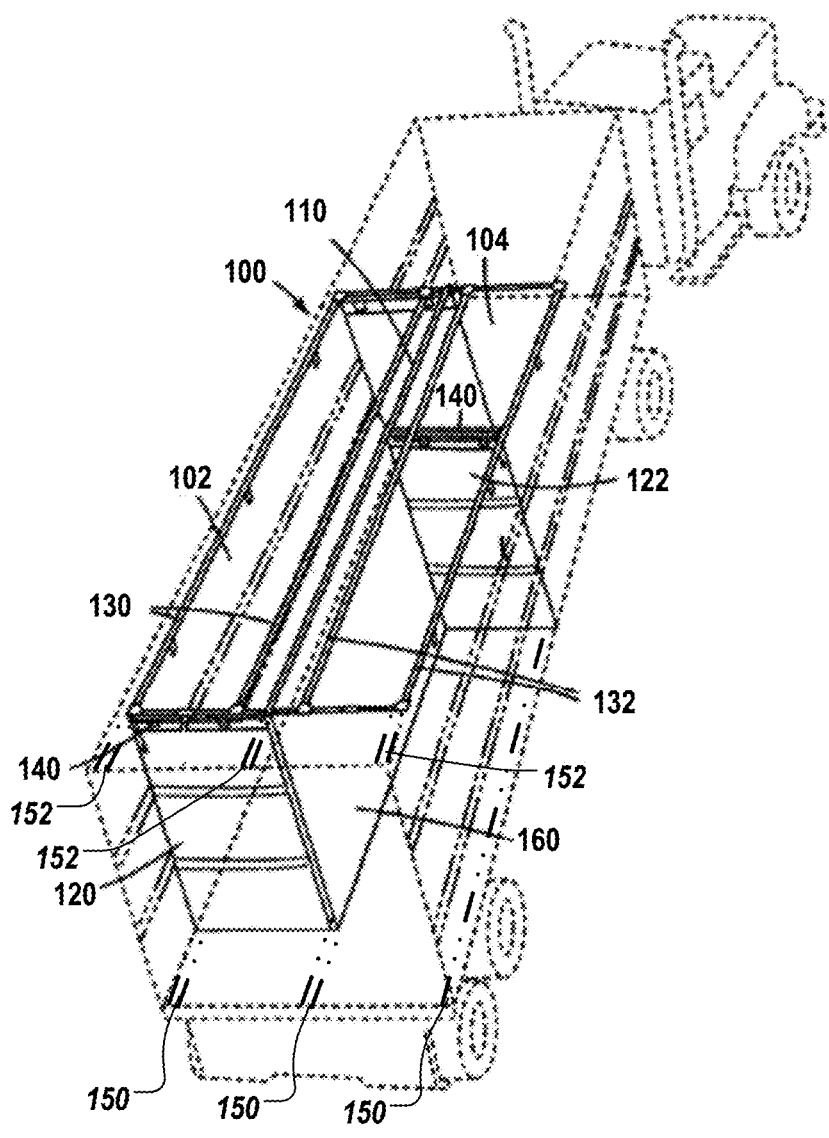
FIG. 1 is a perspective view of a trailer including a partition panel system for separating cargo space of the trailer according to an example.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration.

Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Referring to FIG. 1, a trailer 100 encloses a cargo space or bulkhead. The cargo space is separated into a number of zones or areas 102, 104 that can optionally be maintained at different temperatures. One or more partition panels or panels 110 can be placed side-by-side and fastened together extending along a long axis of the trailer and separate the trailer into a left zone 102 and a right zone 104. Each panel 110 can have various interfitting modular constructions. One or more lateral panels 120, 122 can extend laterally from the centered panel 110 to left and right trailer walls. The right panel 122 is shown mounted forward of the left panel 120, thereby decreasing volume of the right zone 104 relative to the left zone 102.

In some implementations, the lateral panels 120, 122 can be slidably attached to a set of rails 130 with a trolley assembly 140. In this case, the panels can be hingedly attached to trolley assembly 140, and the trolley assemblies are slidably attached to the rails 130, 132. The panel, trolley assembly, and rail system can be implemented in a wide variety of configurations to conform to various usage scenarios. An example of a trolley assembly is provided in U.S. Pat. No. 6,626,625 titled "System and method for partitioning cargo areas" and issued Sep. 30, 2003, herein incorporated by reference in its entirety.

In some implementations, each panel 110 can be configured to be secured with channels and/or extensions built into the cargo space of the trailer using one or more extrusions coupled to each panel 110. In an example, the one or more extrusions can be configured to complement a set of bottom channels 150 and/or a set of top channels 152 of the trailer. In another example, a set of brackets (not shown) can be configured to secure each panel 110 to the cargo space of the trailer.

Figures 2A, 2B, 2C:
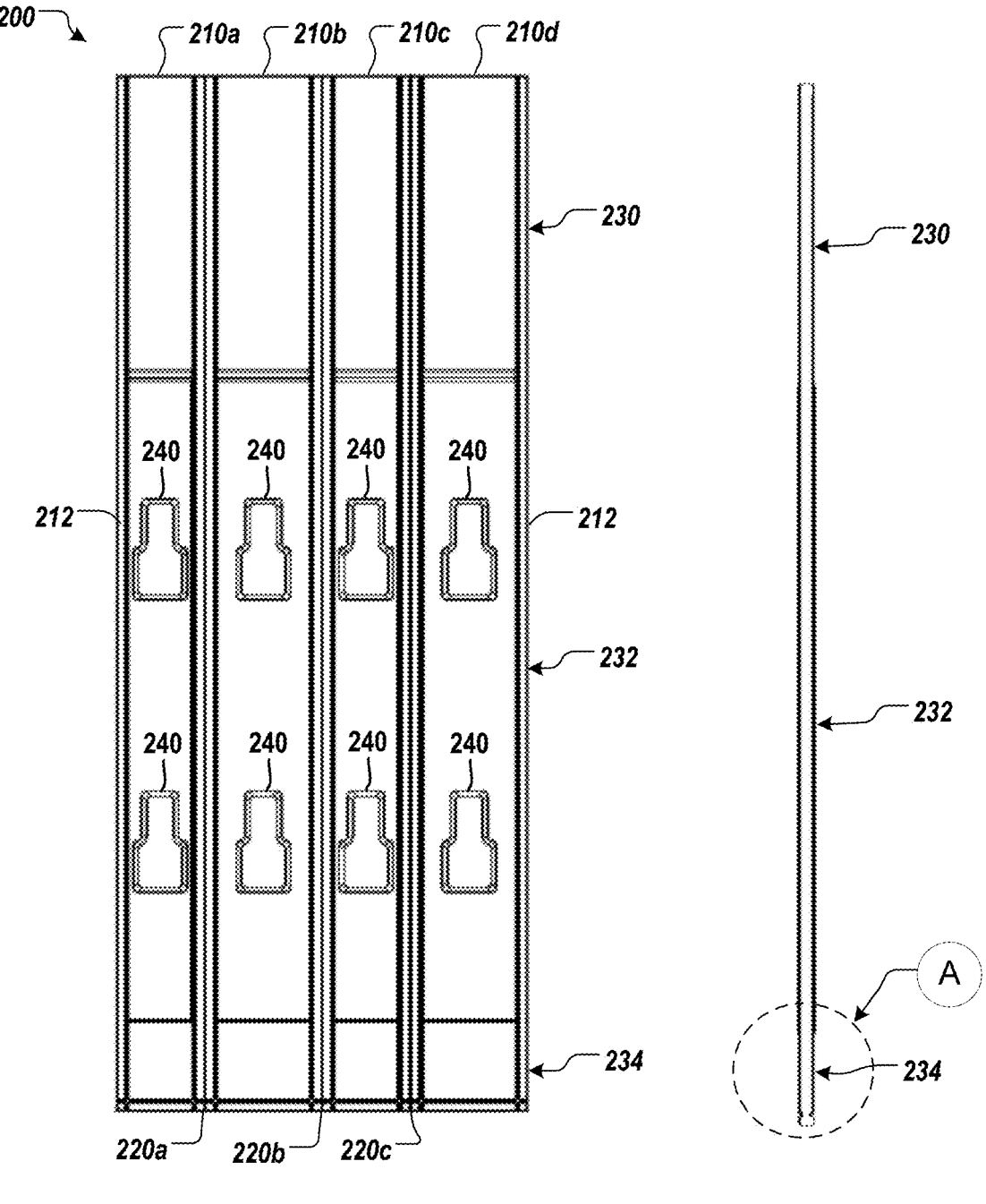
FIG. 2A is a drawing of a front view of a panel including one or more cut lines configured to divide the panel into multiple segments and a pair of grooves proximate each side of each cut line according to an example.
FIG. 2B is a drawing of a side view of the panel of FIG. 2A according to an example.
FIG. 2C is a drawing of a bottom view of the panel of FIG. 2A according to an example.

In some implementations, the panel needs to be modified to match the cargo space of the trailer. FIG. 2A is a drawing of a front view of a panel 200 (110) including one or more cut lines 220a-c configured to divide the panel 200 into multiple segments 210a-d along a panel width according to an example. Each cut line 220a-c is configured to provide a guide for cutting and dividing the panel 200 into a different combination of segments 210a-d allowing the panel 200 to be cut into different predetermined widths. For example, the cut line 220a can split segments 210a-b, the cut line 220b can split segments 210b-c, and the cut line 220c can split segments 210*c*-*d*. Each cut line, in some embodiments, is represented by a visual marker identifying a straight line across the panel 200. For example, the cut line may include a prominent straight line, a dashed line, a dotted line, or another visual marker drawing attention to a straight line across the panel 200. The cut line may be presented in a subtle color to avoid distraction from the look of panel. Alternatively, the cut line may be presented in a vibrant color to aid in proper following during cutting. In some embodiments, each cut line is represented by a depression, concavity, or cleft within the panel. In further embodiments, each cut line includes a thinning or weakening, locally, of panel material to aid in cutting. For example, as illustrated in FIG. 2G, each of the cut lines 220*a*-*c* is represented by a wedge-shaped indentation. While illustrated in FIG. 2G as including cut lines provided in parallel on either side of the panel, in other embodiments, a cut line may be provided on a single surface of the panel. A combination of the above cut line representations, in some embodiments, is provided. For example, the cut line may be provided as a depression, and a visual marker may be laid within the depression to aid in recognition of the cut line path.

In an illustrative embodiment, each cut line is spaced apart having a predetermined spacing such that a spatial rigidity of the panel is not substantially changed. In an example, a removable webbing can be placed at intervals along the length of the cut line to reinforce the rigidity of the panel (not shown). The removable webbing can be removed by cutting at time of installation.

In an illustrative embodiment, each cut line is spaced apart having a predetermined spacing, and when each cut line is cleaved, the panel is configured to have at least one of a new predetermined width and a new predetermined height substantially matching a standard dimension of a trailer's cargo space and/or bulkhead. In an illustrative embodiment, the predetermined spacing can be determined in increments using the U.S. standard or imperial units or using the metric standard. In an illustrative embodiment, a panel can have the predetermined spacing based on a combination of U.S. standard units and the metric standard. In an example, a first predetermined spacing of cut lines on a first side of the panel can be based on U.S. standard units and a second predetermined spacing of cut lines on a second side of the panel can be based on metric units.

As shown in FIG. 2C, each segment 210*a*-*d* can be defined by a pair of cut lines 220*a*-*c* and/or a cut line 220*a*-*c* and a connecting edge 212 of each end of the panel 200. Spacing of each cut line 220*a*-*c* can be varied and configured to form predetermined sized panels having a connecting edge 212 for coupling to the trailer and/or a coupling extrusion. In an example, a panel 200 can include an alternating pattern of cut lines 220*a*-*c* configured to create multiple segments 210*a*-*d* having two or more segment lengths. For example, segment 210*a* can be 9″ wide, segment 210*b* can be 12″ wide, segment 210*c* can be 9″ wide, and segment 210*a* can be 12″ wide, resulting in a panel 200 having segments in a 9″-12″-9″-12″ pattern. The resulting panel 200 can be divided into smaller panels having 9″, 12″, 21″, 30″ and 33″ widths.

During installation, one or more of the cut lines 220 can be cut to modify a dimension of the panel 200. In an example, each cut line 220*a*-*c* can be configured to have a shape spacing or groove to guide a saw blade and facilitate an even cut. In an example, each cut line 220*a*-*c* groove can be configured to guide a ⅛th inch width of a saw blade. In an example, the saw blade can be on a band saw or a cutting jig.

In some implementations, each cut line 220*a*-*c* is configured to strengthen the panel 200 in a vertical direction along a length of the panel 200. For example, a shape of each cut line 220*a*-*c* can provide structural rigidity. In further implementations, panel structure may provide reinforcement to each side of the cut line (e.g., to ensure rigidity and strength of the panel upon cutting).

In an aspect, the panel 200 can include different sections along a length of the panel 200 as well. For example, the panel 200 can be divided into a top section 230, a middle section 232, and a bottom section 234. The top section 230 can be configured for cutting to adjust a height of the panel 200. In an example, when the panel 200 has to be cut for height, the top section 230 can be cut to an appropriate length.

As shown in FIGS. 2A-2B, in some embodiments, the middle section 232 is raised and include one or more recesses 240 for grabbing and holding the panel 200 according to an example. In an example, each recess 240 can be reinforced with a reinforcement layer as further described below.

The panel 200 can include attachment features configured to allow the panel to be installed and replaced much faster to either the channels and/or extensions built into the cargo space of the trailer or to another panel. In an example, the panel can include a set of grooves or depressions that are configured to complement a feature on an extrusion such that they cooperatively form a positive lock, allowing the panel to be installed and replaced much faster. The grooves, for example, may be provided opposite and parallel to each other on each side of a panel, for example proximate to an edge of the panel. In some implementations, the set of grooves include smooth, even depressions within a surface of the panel. In other implementations, the set of grooves include a textured or patterned surface, for example to increase friction with the mating of the complementary extrusion. In some embodiments, the grooves are designed to ensure mechanical strength at the grooves, for example through force distributions designed to be shared with the surrounding panel. Portions of the panel may be reinforced, in some embodiments, to further enhance the mechanical strength of the attachment features.

Figure 2F:
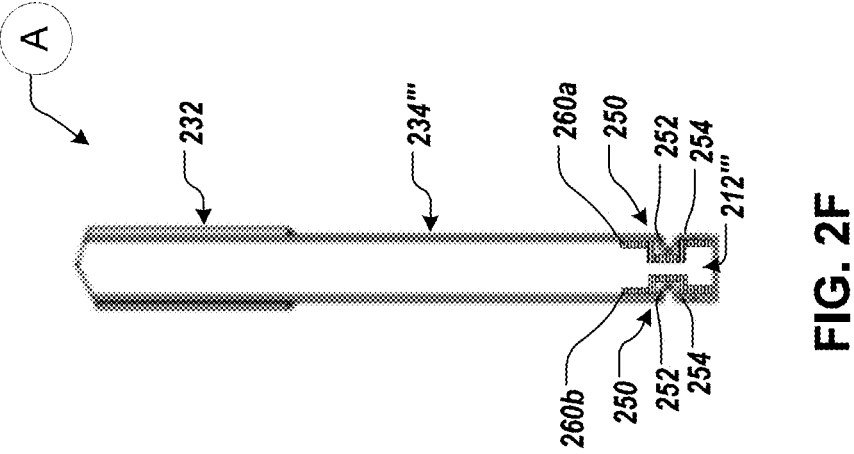
FIGS. 2D-2F are enlarged side views of a bottom section of the panel of FIG. 2B including a pair of grooves at a connecting edge of the panel according to an example.
Figure 2E:
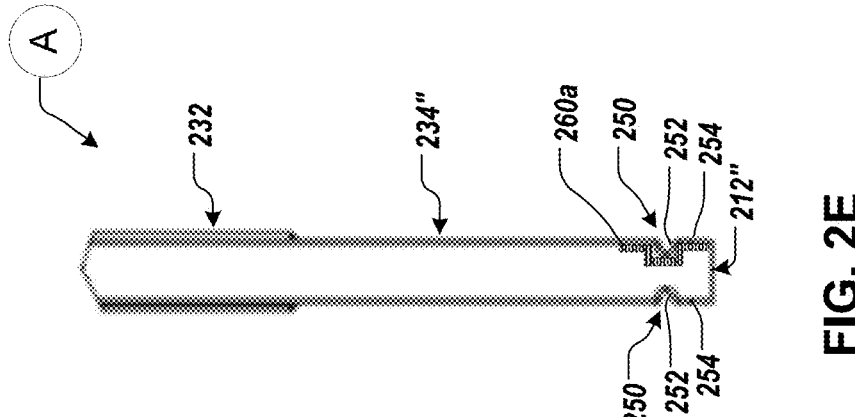
Figure 2D:
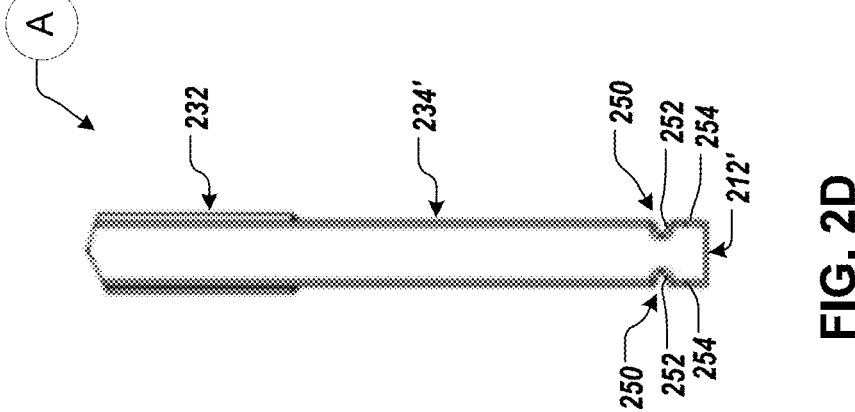
Figure 2G:
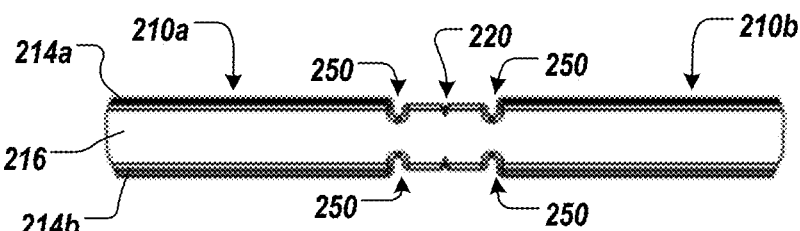
FIGS. 2G-2H show enlarged drawings of a portion the panel including a cut line according to an example.

FIGS. 2D-2F are enlarged side views of the bottom section 234 (234′, 234″, and 234‴, respectively) of the panel 200 of FIG. 2B including a pair of grooves 250 at a connecting edge 212 (212′, 212″, and 212‴, respectively) of the panel 200. In an aspect, each groove 250 can define an indentation 252 and a distal portion 254 to the connecting edge 212. In an example, each indentation 252 can be substantially lateral or perpendicular to the panel 200. The indentation 252 of each groove 250 and the distal portion 254 are configured to mate with a slide-on bottom extrusion (see FIG. 5A).

In some implementations, the panel may be advantageously modified during fabrication to provide additional or different functionalities. In an example embodiment, a bottom section 234″, 234‴ of a panel can include one or more reinforcement layers 260*a*-*b* configured to strengthen the connecting edge 212. Materials used in a reinforcement layer can include sheet metal such as aluminum. In other examples, higher density plastics and polymers can be provided as a reinforcement layer. Other materials for reinforcing the panel with similar characteristics for withstanding fabrication and assembly of the panel may alternatively be used. In an example, the connecting edge 212 can be reinforced on a bottom or side of the panel 200. In an example, the cut line 220 can be reinforced along the length of the panel 200. In an example, the panel can include a first reinforcement layer 260*a* configured to support the grooves 250 and the distal portion 254 of the connecting edge 212 on each side of the panel.

Figure 2H:
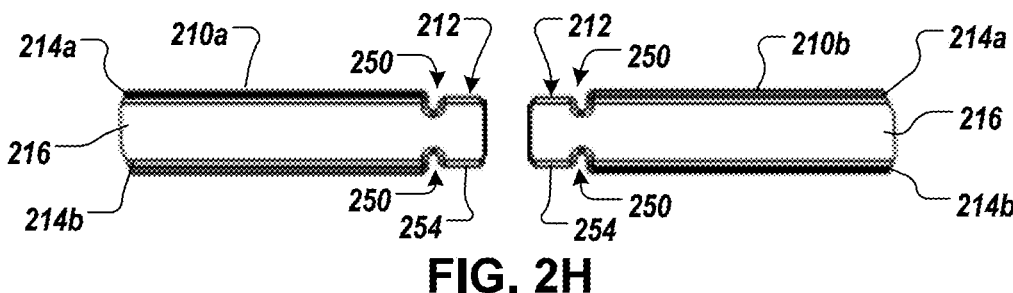

Turning to FIGS. 2G-2J, in some implementations, a panel can be formed from an assembly of a first panel skin 214*a*, a panel core 216, and a second panel skin 214*b*. Assembly methods are further discussed below. FIGS. 2G-2H illustrate two sections of a portion of the panel 200 divided by a cut line 220 which forms a connecting edge 212 on each panel section after separation according to an example. FIG. 2G shows a portion of two segments 210*a-b* of a panel 200 defined in part by a cut line 220, where each segment 210*a-b* includes a pair of grooves 250 separated symmetrically from the cut line 220. As shown in FIG. 2H, after the panel 200 is cut at the cut line 220, each segment 210*a-b* will have a distal portion 254 and a connecting edge 212 where the cut line 220 was. Material from the panel 200 at the cut line is configured to be removed by the cutting of the saw.

The panel skins, in some embodiments, may be composed of skin materials including plastic, polypropylene, fiberglass, fiberboard, vinyl, metals, and reinforced composites. In other examples, higher density plastics and polymers, carbon fibers, as well as layering of combinations of materials can be provided as skin materials. In an example, adhesives can be applied between layering, as well as other bonding methods. In an aspect, the adhesive can be heat activated such that the panel skins bond while pressed in a heated mold. Other materials for forming the panel skin with similar characteristics for withstanding fabrication and assembly of the panel may alternatively be used.

In an example, the cut line 220 can be pre-formed in each of the first panel skin 214*a*, the panel core 216, and the second panel skin 214*b* by molding or vacuum formation. In another example, the cut line 220 can be formed after assembly of the first panel skin 214*a*, the panel core 216, and the second panel skin 214*b*, for example by crimping or stamping. In a further example, the cut line may be formed in part through painting or printing a visible guide upon the surface of the panel skin 214*b*, before or after forming the panel.

Figure 2I:
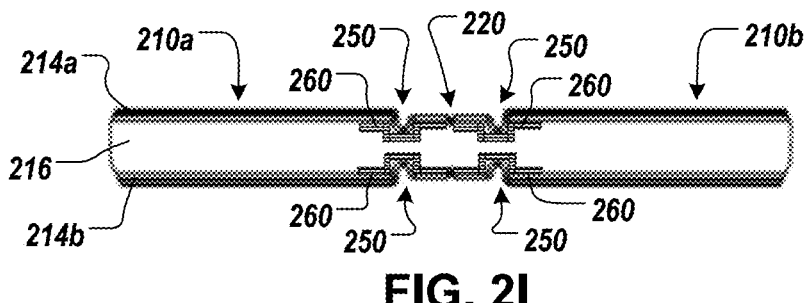
FIG. 2I shows an enlarged drawing of a portion a panel including a cut line with a separated reinforcement layer according to an example.

In some implementations, the one or more reinforcement layers can be added during an assembly process of the panel. FIG. 2I shows an enlarged drawing of a portion a panel including a cut line 220 with a number of separated reinforcement layers 260 according to an example. In an example, the number of separated reinforcement layers 260 are configured to allow unobstructed severing of the cut line 220. In an example, the panel can include a first reinforcement layer 260 adjacent to the cut line 220 and in between the first panel skin 214*a* and the panel core 216, and a second reinforcement layer 262 adjacent to the cut line 220 and in between the second panel skin 214*b* and the panel core 216.

Figure 2J:
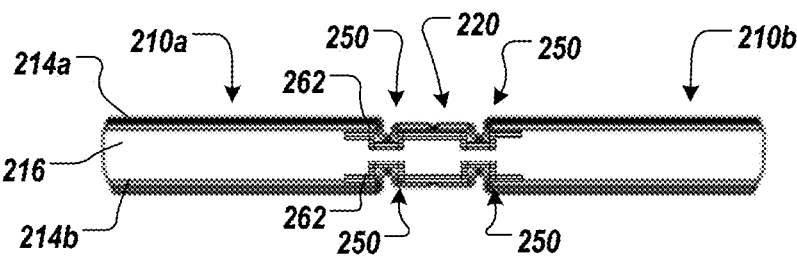
FIG. 2J shows an enlarged drawing of a portion a panel including a cut line with a continuous reinforcement layer according to an example.

In some implementations, a panel 200 can include a cut line 220 with one or more continuous reinforcement layers 262 according to an example (FIG. 2J). In an example, the panel can include a first continuous reinforcement layer 262 in between the first panel skin 214*a* and the panel core 216, and a second continuous reinforcement layer 262 in between the second panel skin 214*b* and the panel core 216. In an example, each of the one or more continuous reinforcement layers 262 can be pre-shaped to match a shape of the grooves 250. Alternatively, a shape of the one or more continuous reinforcement layers 262 matching the shape of the grooves 250 can be formed simultaneously with shaping or crimping of the grooves 250.

Figure 3A:
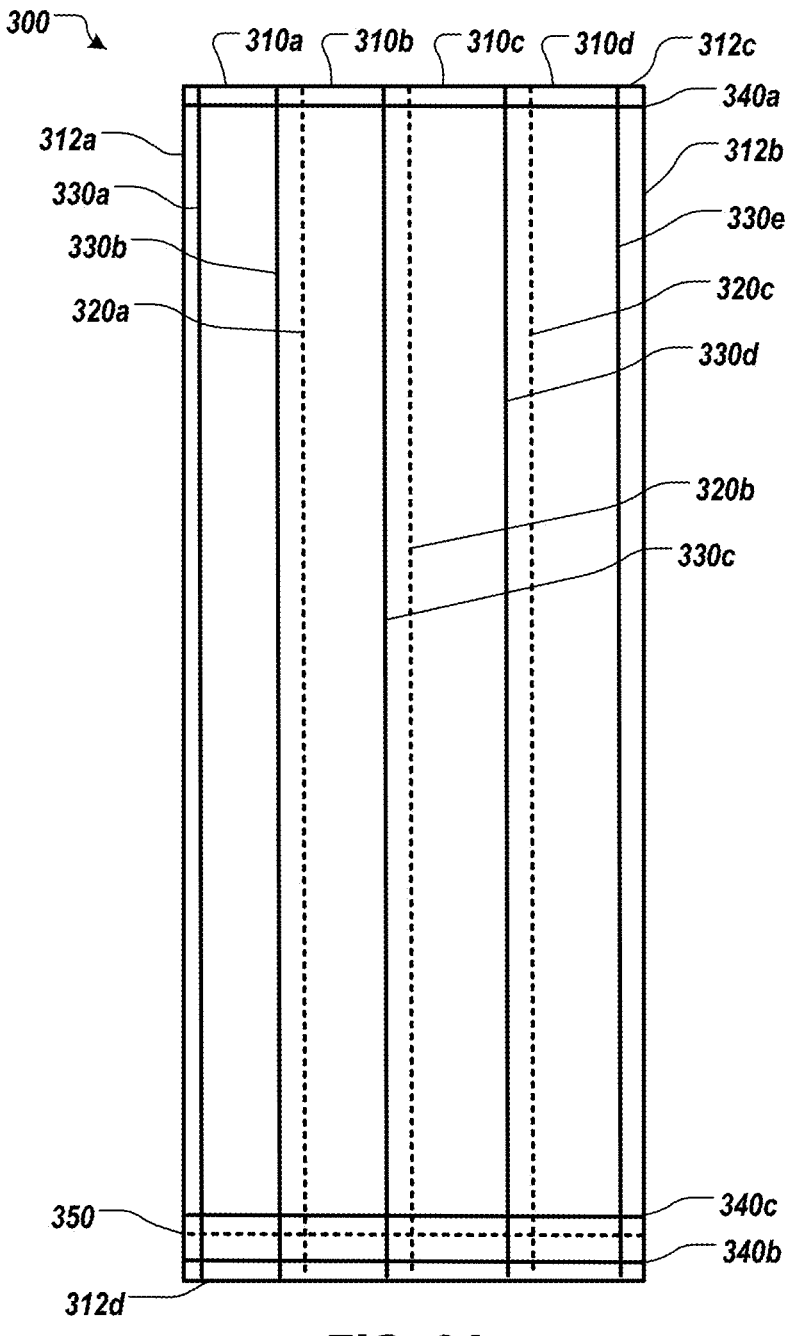
FIG. 3A is a drawing of a front view of a panel including one or more cut lines configured to divide the panel into multiple segments and a pair of grooves proximate at least one side of each cut line according to an example embodiment.
Figure 3B:
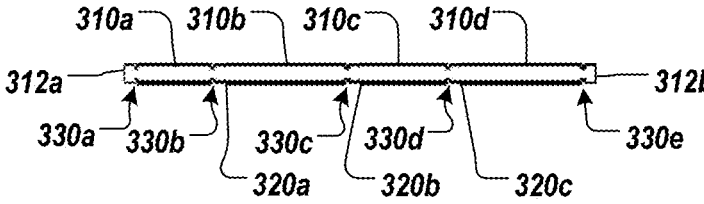
FIG. 3B is a drawing of a bottom view of the panel of FIG. 3A according to an example.

Turning to FIGS. 3A-3B, in some implementations, a panel section 300 (e.g., proximate an edge of a panel) can include one or more vertical cut lines 320*a-c*, where each vertical cut line 320*a-c* is configured to divide the panel into multiple segments 310*a-d*, and a pair of grooves 330*a-e* proximate at least one side of each vertical cut line 320*a-c*. In this example, directionality will be important to consider prior to cutting each vertical cut line 320*a-c* to form a panel with an appropriate width and a connecting edge 312*a-d*.

In some implementations, the panel 300 can include one or more horizontal cut lines 350 proximate to a vertical edge of the panel 300, where when each horizontal cut line 350 is cut, a new connecting edge 312 is formed at the cut vertical edge of the panel 300, thereby adjusting a height the panel 300. In an example, the panel 300 can include one or more grooves 340*a-c* proximate either an edge of the panel 300 or each horizontal cut line 350.

Panel Assembly

A panel assembly for partitioning a trailer cargo space is provided where two panels can be trimmed out with a set of extrusions that mate and allow additional panels to form a wall. In an example, two panels 200, 300 can be connected using a pair of complementary mating extrusions configured to attach to each side of each panel 200, 300. In an example, the mating extrusions can be made from nylon or plastic and can have complementary shapes such as a male-female or a bull and H-shape. In an example, a first mating extrusion can be a bull shaped extrusion and a second mating extrusion can be a H-shaped extrusion configured to secure to the bull shaped extrusion.

Turning to FIGS. 4A-4E, different examples of bull shaped extrusions 410*a-b* and H-shaped extrusions 450*a-c* are shown. The bull shaped extrusion 410*a* includes a first end having two walls 420*a* forming an opening 426 configured to secure a connecting edge 212 of the panel 200, 300, and a second end having a bull shape 430*a-b* configured to secure to the H-shaped extrusion 450*a-b*. In an example, the bull shaped extrusion 410*a-b* can include a support 432*a-b* between the first end and the second end. In an example, the support 432*a-b* can be configured to support a shape of the bull shape 430*a* and prevent it from collapsing.

In some implementations, the H-shaped extrusions 450*a-c* include a first end having two walls 460*a-b* forming an opening 466 configured to secure a connecting edge 212 of the panel 200, 300, and a second end having an H shape 470*a-b* configured to secure to the second end (430*a-b*) of the bull shaped extrusion 410*a-b*.

In some embodiments, each of the two walls 420*a-b* of the bull shaped extrusion 410*a* and each of the two walls 460*a-b* of the H-shaped extrusion 450*a-c* include a guide 424*a-b*, 464*a-b* configured to fit into a groove 250 of the connecting edge 212 of the panel 200, 300. This mechanical coupling of the grooves 250 and guides 424*a-b*, 464*a-b* allows for securing of the two panels 200 without additional bonding (See FIG. 5A). The guides 424*a-b*, 464*a-b* may be shaped complementary to the shape of the corresponding groove 250. For example, the guides 424*a-b*, 464*a-b*, having a substantially squared-off appearance, may be designed to interface with a rectangular groove concavity. In other implementations, the guides 424*a-b*, 464*a-b* may be rounded or triangular. The 424*a-b*, 464*a-b*, in some embodiments, are designed including a deformable material such that the guides 424*a-b*, 464*a-b* mate with the grooves in a manner that avoids any gap and encourages frictional and/or tensional mating between the surfaces. In some embodiments, the material of the guides 424*a-b*, 464*a-b* may be textured or constructed such that it has some compressibility (e.g., such as an accordion fold) for applying force within the groove upon positioning.

In some implementations, the guides 424*a-b*, 464*a-b* can have different thicknesses and lengths configured to complement different shaped grooves 250. In an example, each complementary guide on each mating extrusion has at least one of a unique thickness and a length configured to complement each groove. In an example, groove 424*a* can be thicker in a vertical direction, as compared to groove 464*a*, which can secure a wider groove. In an example, groove 464*b* can be longer inward, as compared to groove 464*a*, which can secure further into a deeper groove.

In an aspect, the mating extrusions 410*a-b*, 450*a-c* can have slight differences in the strength, materials used, and flexibility features. For example, FIG. 4A shows each wall 420*a* of the bull shaped extrusion 410*a* having a tapered wall 422 and FIG. 4B shows the bull shaped extrusion 410*b* having a notch 428 in the support 432*b*. Similarly, FIG. 4C shows each wall 460*a* of the H-shaped extrusion 450*a* having a tapered wall 462 and FIG. 4D shows the H-shaped extrusion 450*b* having a notch 468 according to an example. In an aspect, the tapered wall 422, 462 and the notch 428, 468 can provide flexibility and stress relief from widening of the walls 420*a-b*, 460*a-b*. In another aspect, the tapered wall 422, 462 can provide a recess to allow for a head of a fastener to be flush with the walls 420*a-b*, 460*a-b* when a fastener is used to secure the mating extrusions 410*a-b*, 450*a-c* to the panel 200, 300. In an example, a center groove of the tapered wall 422, 462 can be used to align a drill bit and a self-fastening screw. In an example, the fastener can be configured to secure to the reinforcement layer 260, 262. Importantly, in this case, the fastener does not need to pass through an entire thickness of the panel which provides additional thermal isolation across the panel thickness.

As noted above, the second end of the H shape is configured to secure to the second end (430*a-b*) of the bull shaped extrusion 410*a-b* using extensions 470*a-b*. Mating, for example, may entail frictional and/or tensional mating between the H shape extensions 470*a-b* and the bull shaped extrusion 410*a-b*. In an example, at least one of the H shape extensions 470*a-b* may be designed with a flexible portion or with flexible material configured to exert an internally-directed spring force upon the bull shaped extrusion 410*a-b*. In another example, the bull shaped extrusion 410*a-b* may be designed of flexible material such that it deforms and applies an outward force upon the H shape extensions 470*a-b* upon mating. In a further example, at least one of the H shape extensions 470*a-b* and the bull shaped extrusion 410*a-b* may include a surface treatment (e.g., textured, patterned, etc.) designed to increase frictional force between the H shape extensions 470*a-b* and the bull shaped extrusion 410*a-b*.

Turning to FIG. 4D, in some embodiments, the H shape 470*a-b* includes a pair of flanges 472 configured to grip the bull shape 430*a-b* end of the bull shaped extrusion 410*a-b*. The flanges 472, in some embodiments, are designed including a deformable material such that the flanges 472 mate with the bull shape 430*a-b* end in a manner that encourages frictional and/or tensional mating between the surfaces. In some embodiments, the material of the flanges 472 may be textured or constructed such that it has some compressibility (e.g., such as an accordion fold) for applying force against the bull shape 430*a-b* end upon positioning.

FIGS. 4F-4G are drawings of cross sections of assembly extrusions 480 according to an example. In an example, the assembly extrusion 480' can have a butting end 482 having a pair of walls 484, where each wall 484 has a guide 486 configured to fit into a groove 250 of the connecting edge 212 of the panel 200, 300 as well as individual skins making the panels. In an example, the butting end 482 includes a notch 488' configured to abut an edge of each skin. Similarly, the assembly extrusion 480" can have a butting end 482 having a pair of walls 484, where each wall 484 has a guide 486 configured to fit into a groove 250 of the connecting edge 212 of the panel 200, 300 as well as individual skins making the panels. In an example, the butting end 482 includes a notch 488" configured to separate each skin for facilitating assembly of the panel. The notch 488" can further include a notch tip 494 for separating each panel skin and a spacer 492 for separating the panel skins at a predetermined distance allowing for thicker panels (see FIG. 5B). In an aspect, the notch tip 494 can extend beyond the guide 486 in order to engage with the ends of the panel skins before contact with the guide 486 when assembling the panel by a snapping on method.

Figure 5A:
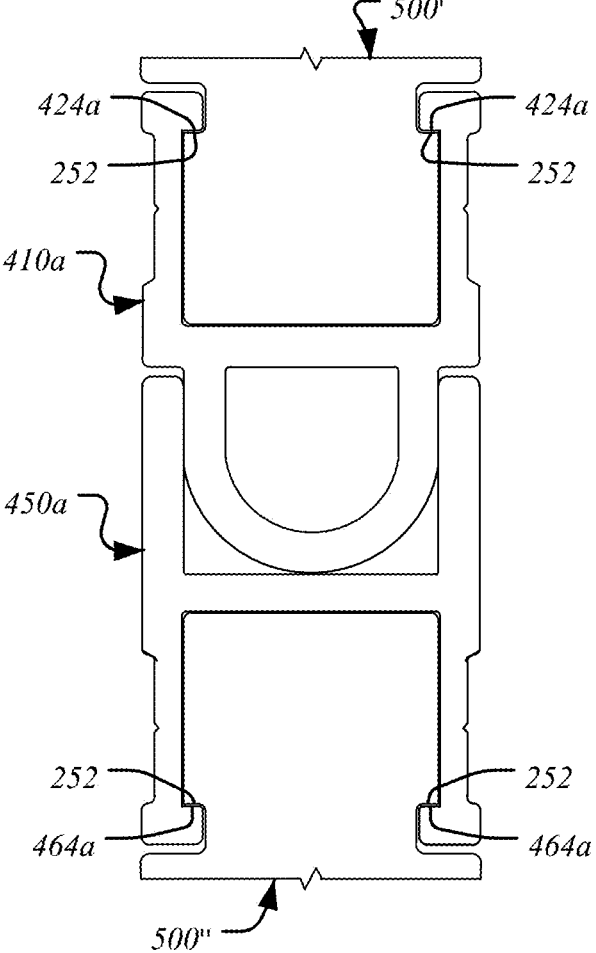
FIG. 5A is a drawing of the bull shaped extrusion shown in FIG. 4A connected to a connecting edge of a first panel and the H-shaped extrusion shown in FIG. 4C, according to an example.
Figure 5B:
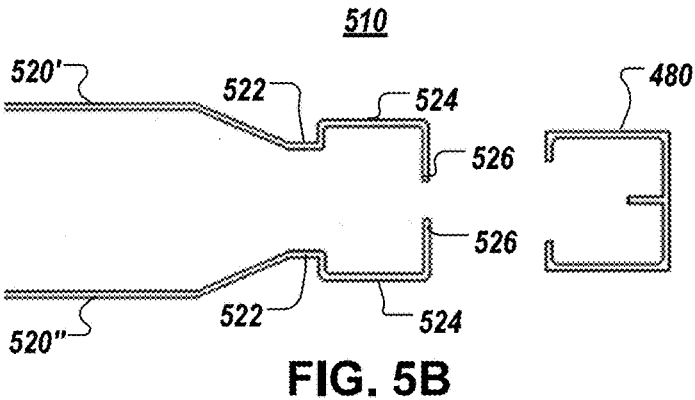
FIG. 5B is a drawing of a first panel skin, a second panel skin, and the assembly extrusion shown in FIG. 4C, according to an example.

Turning to FIG. 5A, the opening 426 of the bull shaped extrusion 410*a* (FIG. 4A) is shown connected to a connecting edge 212 of a first panel 500' and an opening 474 of the H-shaped extrusion 450*a* (FIG. 4C), which is connected to a connecting edge 212 of a second panel 500" according to an example. As shown, each indentation 252 of each groove 250 on the first panel 500' is configured to catch the guide 424*a* of the bull shaped extrusion 410*a* and each indentation 252 of each groove 250 on the second panel 500" is configured to catch the guide 424*b* of the H-shaped extrusion 450*a*. In an aspect, mating of the bull shaped extrusion 410*a* to the connecting edge 212 of the first panel 500', and the H-shaped extrusion 450*a* to the connecting edge 212 of the second panel 500" are each configured to create a thermally insulated and airtight seal. In an aspect, mating of the bull shaped extrusion 410*a* and the H-shaped extrusion 450*a* is configured to create a thermally insulated and airtight seal.

Turning to FIGS. 5B-5E, assembly of a panel edge is shown from a pair of skins and an assembly extrusion according to some implementations. As a first step 510 shown in FIG. 5B, a first panel skin 520' and a second panel skin 520" are provided having complementary shapes including a skin groove 522 connected to a distal portion 524 and a partial edge 526 according to an example. In some implementations, providing the skins can include trimming a portion of one or more edges of each skin extending beyond a mold shape. In an aspect, the partial edge 526 is configured to form a portion of the connecting edge 212 of the panel 200 as shown in FIG. 2D. In an aspect, each skin groove 522 can have a sharp edge (FIGS. 2G-2J) and/or a ramped edge (FIGS. 5B-5D) shape leading to the surface of the panel. In an example, the edge shape leading to the surface of the panel can be configured for enhancing prevention of slippage and/or removal of connected extrusions (FIGS. 4A-4G).

Figure 5C:
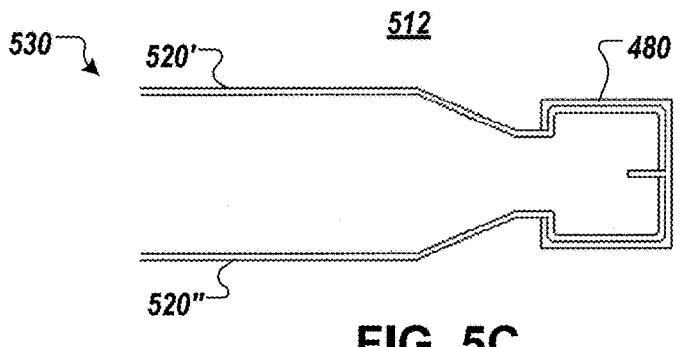
FIG. 5C is a drawing of a panel assembly of the first panel skin secured to the second panel skin using the assembly extrusion shown in FIG. 5D, according to an example.

As a second step 512 shown in FIG. 5C, the first panel skin 520' is secured to the second panel skin panel skin 520" using the assembly extrusion 480 forming an assembled panel assembly 530. A distal end of each partial edge 526 of each panel skin 520', 520" abuts on the notch 488 of the assembly extrusion 480 while each guide 486 is secured against each skin grove 522. In an example, the assembly extrusion 480 is slid on along the skins of the assembled panel assembly 530. In another example, the assembly extrusion 480" can be snapped directly on the skins, where each distal end of each partial edge 526 of each panel skin 520', 520" abuts on the elevated spacer 492 of the notch 488" of the assembly extrusion 480". In an aspect, the assembly extrusion 480 acts as the connecting edge 212 of the assembled panel assembly 530. In some implementations, the assembled panel assembly 530 can be filled with filling material (not shown) which can further secure parts of the assembled panel assembly 530. The filling material, in some examples, may include a blowing agent, an expandable foam, a fiber network such as honeycomb fibers, fiberglass, a compressible scaffolded material such as corrugated plastic or paper material, or a polymer resin.

Figure 5D:
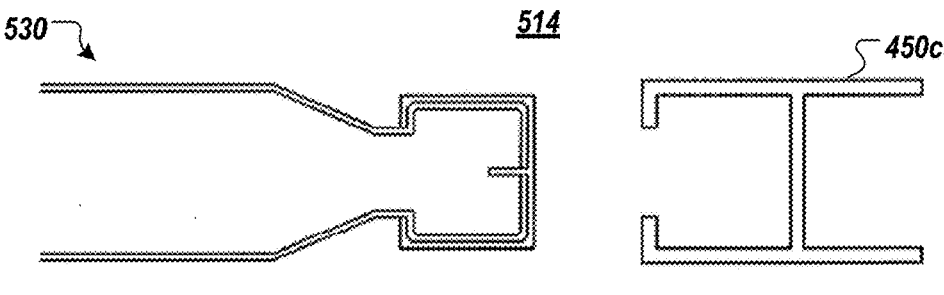
FIG. 5D is a drawing of the panel assembly FIG. 5C and the H-shaped extrusion shown in FIG. 4E, according to an example.
Figure 5E:
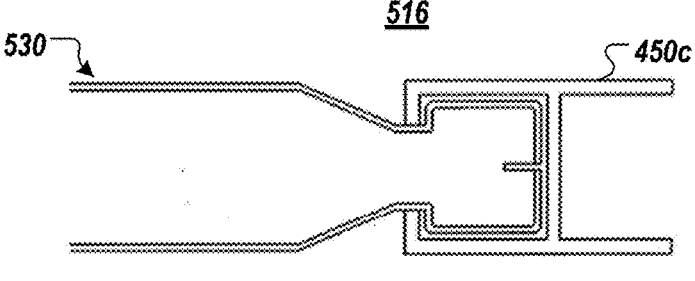
FIG. 5E is a drawing of the panel assembly secured to the H-shaped extrusion shown in FIG. 5E, according to an example.

In step 514 as shown in FIG. 5D, an extrusion is provided for connecting to the assembled panel assembly 530. H-shaped extrusion 450c shown in FIG. 4E is provided, according to an example, however, in other embodiments, the extrusion 450C may include additional features, such as notched features illustrated in the extrusions of FIGS. 4C and 4D. Further, in other embodiments, rather than an "H" shape other shapes may be provided, such as the curved shapes of the extrusions described in relation to FIGS. 4A and 4B.

Finally, in step 516 the assembled panel assembly 530 secured to the H-shaped extrusion shown 450c, according to an example. In some implementations, extrusions 410, 450 can be secured to the assembly extrusion 480 by screwing into the notch 488 of the assembly extrusion 480.

Figure 6A:
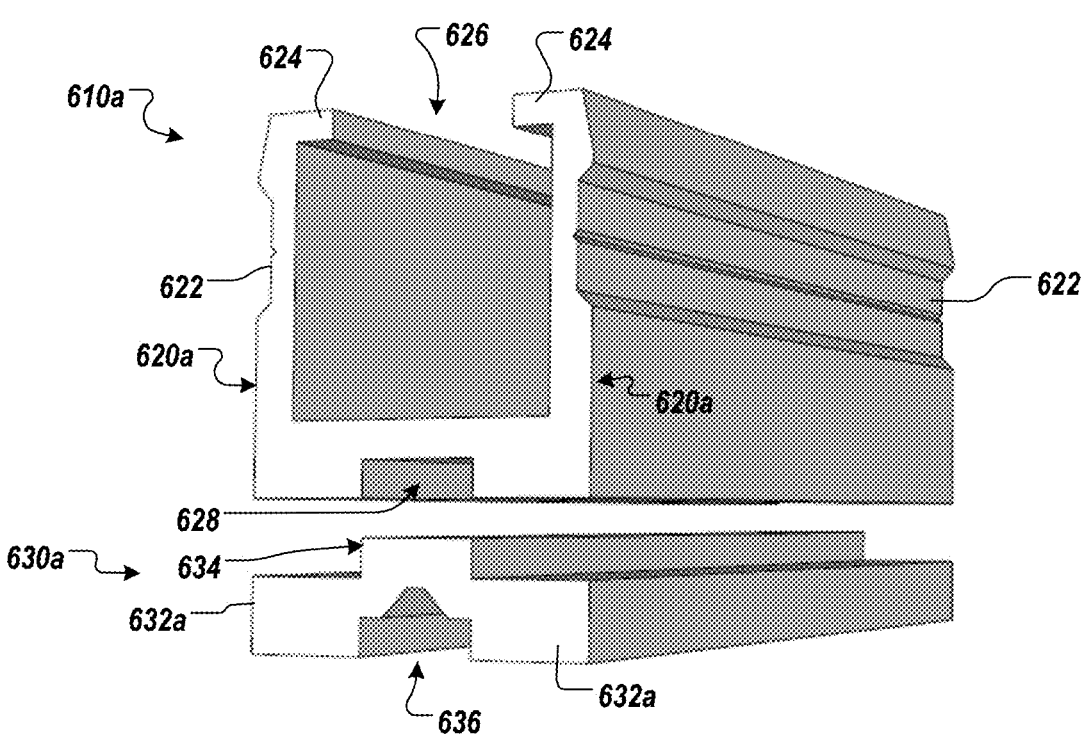
FIG. 6A is a drawing of a bottom extrusion with a stacking plate according to an example.
Figure 6B:
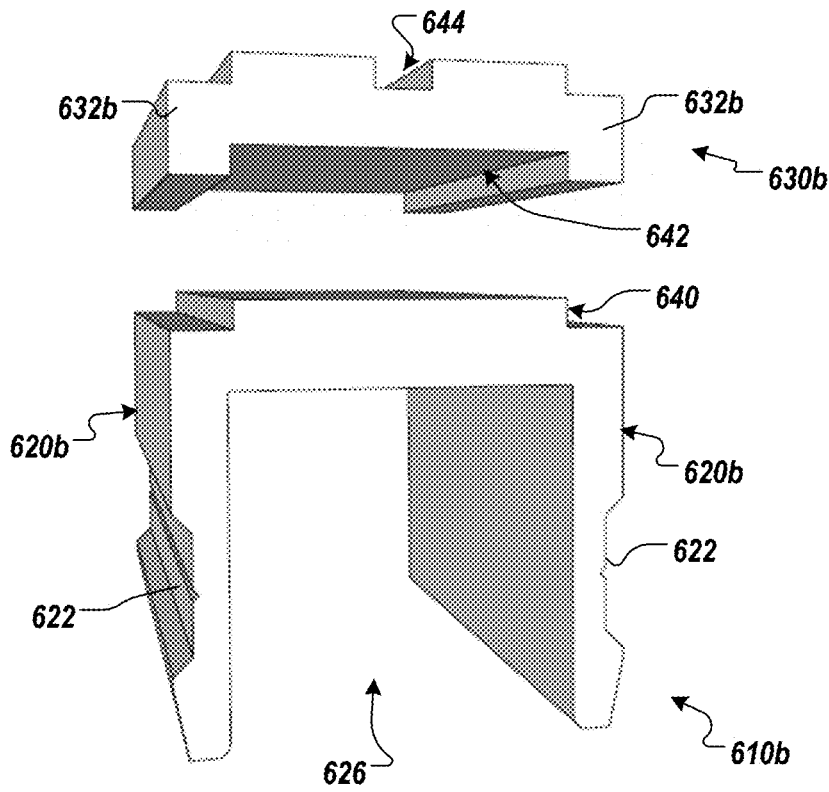
FIG. 6B is a drawing of a top extrusion with a stacking plate according to an example.

Turning to FIGS. 6A-6B, examples of a bottom extrusion 610a and a top extrusion 610b each having two walls 620a-b forming an opening 626 configured to secure a bottom connecting edge 212 and a top edge of the panel 200, 300 are shown.

As illustrated in FIG. 6A, at least one of the bottom extrusion 610a and the top extrusion 610b may include a set of guide flanges 624 configured to fit into a set of grooves 250 of the connecting edge of a panel (e.g., edge 212 of the panel 200, 300 as illustrated in FIG. 2H). As discussed previously regarding the mechanical coupling of the grooves 250 and guides 424a-b, 464a-b for securing of the two panels 200 without additional bonding (See FIG. 5A), the guide flanges 624 may be shaped complementary to the shape of the corresponding groove 250. For example, the guide flanges 624, having a substantially squared-off appearance, may be designed to interface with a rectangular groove concavity. In other implementations, the guide flanges 624 may be rounded or triangular. The guide flanges 624, in some embodiments, are designed including a deformable material such that the guide flanges 624 mate with the grooves in a manner that avoids any gap and encourages frictional and/or tensional mating between the surfaces. In some embodiments, the material of the guide flanges 624 may be textured or constructed such that it has some compressibility (e.g., such as an accordion fold) for applying force within the groove upon positioning.

In some implementations, the guide flanges 624 can have different thicknesses and lengths configured to complement different shaped grooves 250. In an example, each complementary guide flange on each mating extrusion may have at least one of a unique thickness and a length configured to complement each groove.

In some embodiments, each wall 620a of the bottom extrusion 610a includes a tapered wall portion 622. Further, each wall 620b of the top extrusion 610b may include a tapered wall 622. In an aspect, the tapered wall portion 622 can provide flexibility and stress relief from widening of the walls 620. In another aspect, the tapered wall portion 622 can provide a recess to allow for a head of a fastener to be flush with the walls 620 when a fastener is used to secure the 610a to the panel 200, 300. In an example, a center groove of the tapered wall portion 622 can be used to align a drill bit and a self-fastening screw.

In some implementations, a stacking plate 630a-b can be fitted during installation in the field to meet height requirements of a particular trailer. In an example, a lower stacking plate 630a can include a base 632a and a tongue 634 (e.g., a raised portion) configured to fit into a concavity 628 of the bottom extrusion 610a. In an example, an upper stacking plate 630b can include a base 632b and a concavity 642 configured to fit into a tongue 640 (e.g., a raised portion) of the top extrusion 610b. In some embodiments, two or more stacking plates 630a-b may be positioned between the corresponding extrusion 610a-b and the trailer surface. Although illustrated as having squared edges, in other embodiments, the mating tongues 634, 640 and corresponding concavities 628, 642 may include a different shaped surface. Further, the mating tongues 634, 640 and corresponding concavities 628, 642 may include a texture or patterning designed to increase friction between the mating surfaces to ensure stable connection.

In some embodiments, the stacking plates 630a-b are designed to be secured to the corresponding extrusion 610a-b using one or more fasteners (not shown). In an example, the stacking plate 630a-b can include a groove 636, 644 or, alternatively, one or more openings configured to allow each fastener to be flush with the base 632a-b when fastened. Further, in some embodiments, the stacking plates 630a-b may include one or more fastener receiving apertures, such as a threaded aperture to receive a screw fastener.

Figure 6C:
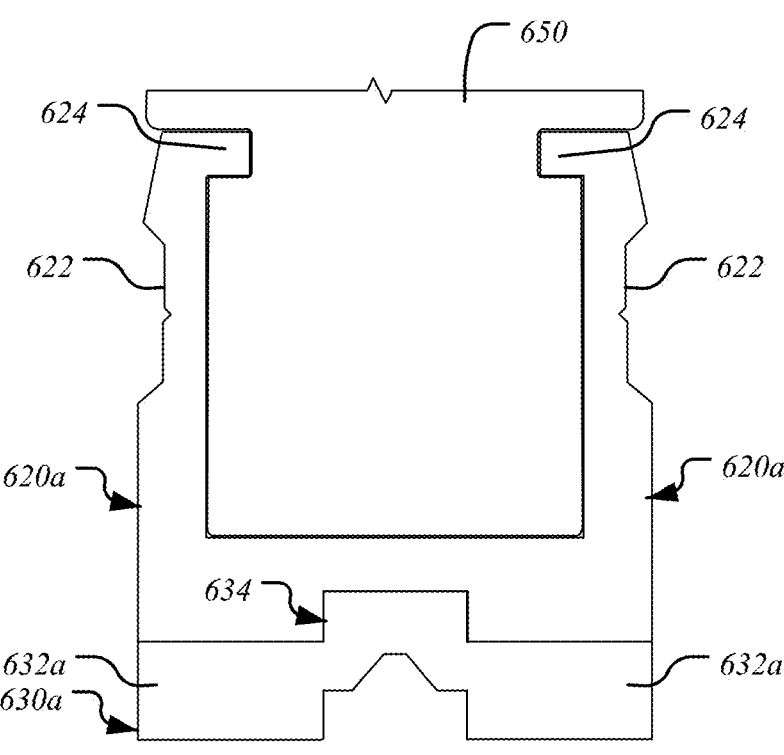
FIG. 6C is a drawing of a cross section of a panel connected to the bottom extrusion assembled with the stacking plate of FIG. 6A according to an example.
Figure 6D:
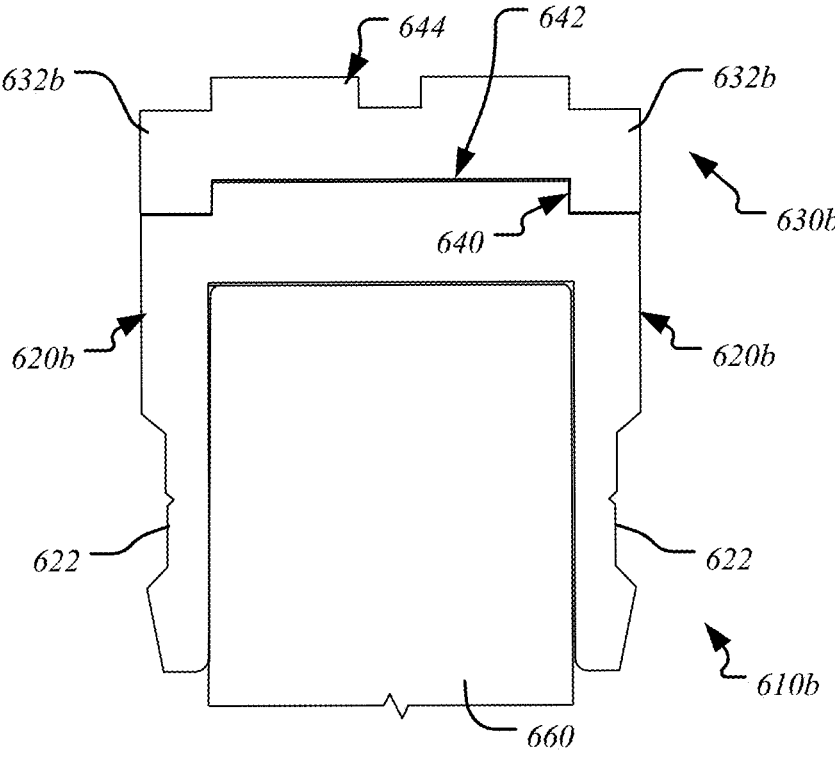
FIG. 6D is a drawing of a cross section of a panel connected to the top extrusion assembled with the stacking plate of FIG. 6B according to an example.

FIG. 6C is a drawing of a cross section of a bottom edge of a panel 650 connected to the bottom extrusion 610a assembled with the stacking plate 630a of FIG. 6A according to an example. FIG. 6D is a drawing of a cross section of a top edge of a panel 660 connected to the top extrusion 610b assembled with the stacking plate 630b of FIG. 6B according to an example.

Figure 7A:
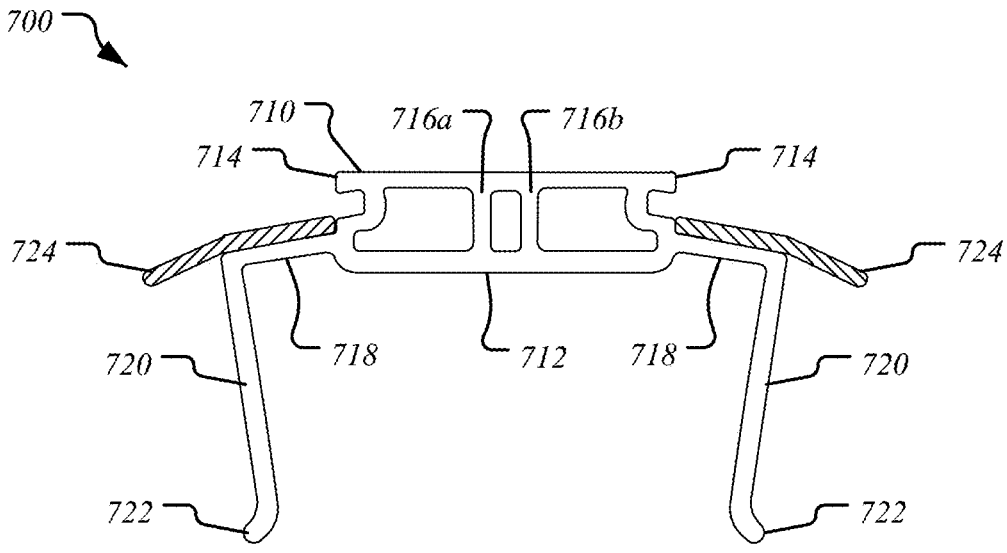
FIG. 7A is a drawing of a cross section of a top extrusion according to an example.

Turning to FIG. 7A, a cross section of a top extrusion 700 configured to secure a top edge of the panel 200, 300 is shown according to an example. In some implementations, the top extrusion 700 can be configured to secure with the set of top grooves 152 of the trailer (FIG. 1). In an example, the top extrusion 700 includes a top frame 710 connected to a bottom frame 712 by a support 716a-b, a pair of lateral extensions 718 where each lateral extension 718 extends from a lateral side of the bottom frame 712, a mounting leg 720 extending down from each lateral extension 718, and a flexible sealing flap 724 on top of each lateral extension 718 and extending outward from each lateral extension 718. In an example, the flexible sealing flap 724 is configured to secure the top extrusion 700 into the set of top grooves 152 of the trailer. The support 716a-b, in some embodiments, is manufactured of a flexible material. For example, as illustrated, the support 716a-b is a ribbed support which may expand and contract to adjust to mounting conditions. In other examples, the support 716a-b may be an accordioned or other folding support or a stretchable support (e.g., a rubber elastomer, etc.).

In an example, each lateral end of the top frame 710 can have a flange 714 for securing with the set of top grooves 152 of the trailer. In an example, each lateral extension 718 can have a slight angle downward relative to the bottom frame 712, where the mounting legs 720, when extending substantially normal to the lateral extension 718, are configured to grip a panel 706 between the mounting legs 720 (see FIG. 7C). In an aspect, the mounting legs 720 allow for ease of assembly for variations of a panel thickness. In an example, a distal end of each mounting leg 720 can have a curved shape configured to guide placement of the panel between the mounting legs 720. In an example, the flexible sealing flaps 712 are configured to generally restrict flow of air along an upper portion of a periphery of the top extrusion 700. In an example, the top frame 710 can be hollow and supported by the support 716.

In some implementations, a top stacking plate 702 (FIG. 7B) can be fitted during installation in the field to meet height requirements of a particular trailer. In an example, the top stacking plate 702 can include a top frame 710 connected to a bottom frame 732 by a support 734*a-b*, a pair of lateral extensions 738 where each lateral extension 738 extends from a lateral side of the top frame 710 and connects to an elbow 740 extending down and then connecting to a lateral portion of the bottom frame 732. The support 734*a-b*, as illustrated, is a ribbed support which may expand and contract to adjust to mounting conditions. In other examples, the support 734*a-b* may be an accordioned or other folding support or a stretchable support (e.g., a rubber elastomer, etc.).

Figure 7B:
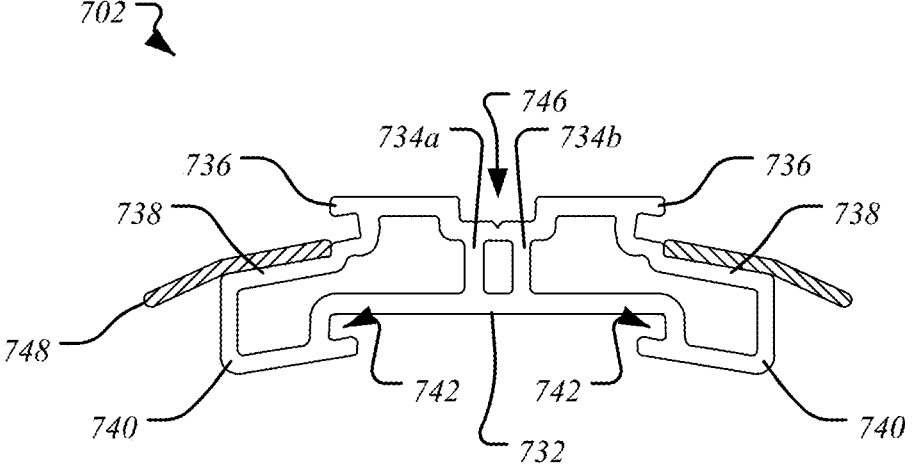
FIG. 7B is a drawing of a cross section of a top stacking plate according to an example.
Figure 7C:
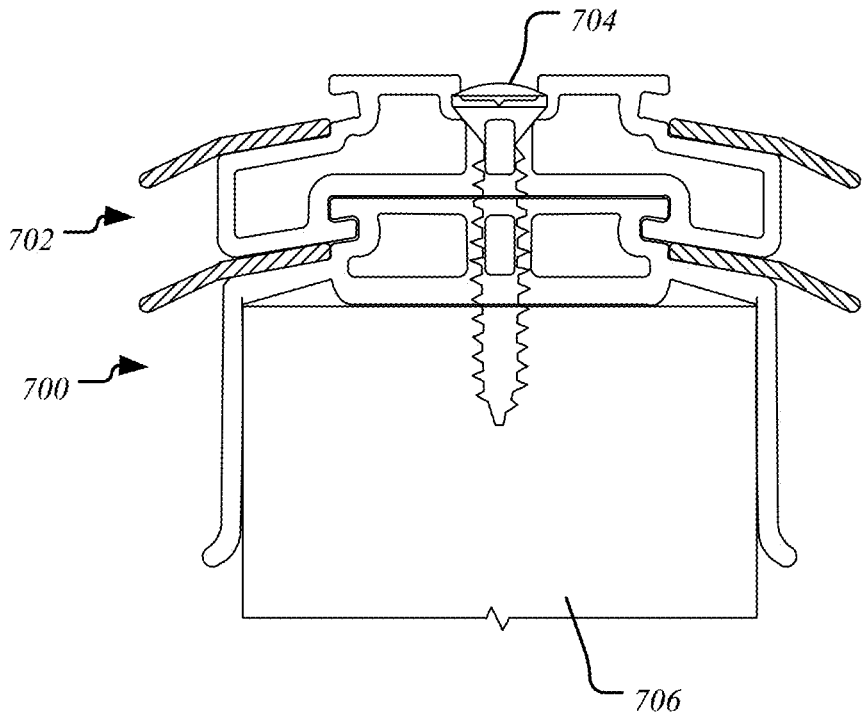
FIG. 7C is a drawing of a cross section of a panel connected to the top extrusion which is secured the top stacking plate using a fastener according to an example.

In an example, each lateral end of the top frame 710 can have a flange 736 for securing with the set of top grooves 152 of the trailer, while each lateral portion of the bottom frame 732 is shaped to form a channel 742 configured to secure each flange 714 of the top frame 710 (See FIG. 7C). In an aspect, interaction of the pair of channels 742 of the top stacking plate 702 with the pair of flanges 714 of the top frame 710 are configured to minimize a need for a number of fasteners to secure the top stacking plate 702 in place. In an example, the pair of channels 742 of the top stacking plate 702 can slide on the pair of flanges 714 of the top frame 710.

A bottom extension defining each channel, in some embodiments, are designed including a deformable material such that the bottom extensions mate with the flanges 714 in a manner that avoids any gap and encourages frictional and/or tensional mating between the surfaces. In some embodiments, the material of the guides flanges may be textured or constructed such that it has some compressibility (e.g., such as an accordion fold) for applying force within the channel upon positioning.

The top stacking plate 702, in some embodiments, further includes a flexible sealing flap 748 on top of each lateral extension 738 and extending outward from each lateral extension 738 according to an example. In an example, the flexible sealing flap 748 is configured to secure the top stacking plate 702 into the set of top grooves 152 of the trailer. In an example, the top stacking plate 702 can be further secured to the top extrusion 700 using a fastener or a screw 704. As shown in FIGS. 7B-7C, the top frame 710 can include a notch 746 configured to allow the screw 704 to be flush with the top frame 710.

Fabrication

Fabrication of a panel having one or more cut lines can be done according to several scenarios. In some implementations, the panel is fabricated using two panel skins with a sheet of foam core or insulation inserted between the panel skins. In some implementations, each skin is formed using an open mold or using a twin sheet vacuum-formed process. In an example, the skin can be made starting with fiberglass cloth that is put into a mold and impregnated with resin. In another example, a fiberglass pre-impregnated with resin can be shaped by vacuuming/compressing in a mold. Other fabrication processes and methods known in the art may be used including light resin transfer molding (RTM), bag molding, and vacuum infusion processes. In an example, the foam core can be made from polystyrene and polyethylene. In some implementations, the foam core can be made with single or multiple part foam materials configured to be injected and to fill space between two pre-molded skins. In some implementations, fabrication of a panel can be done by injection of filling material to fill space between two unmolded skins, which is then placed into a mold and shaped.

Figure 8A:
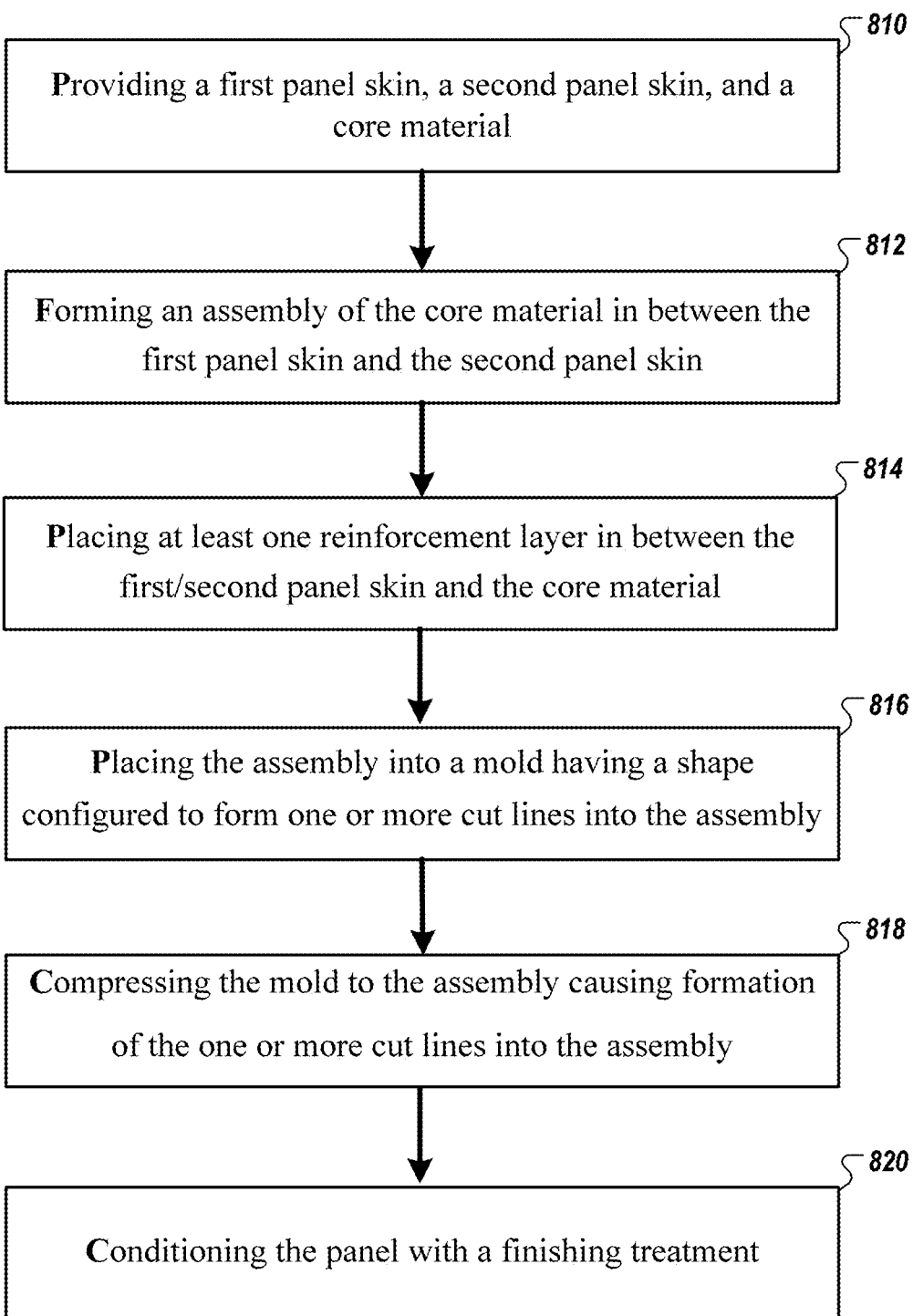

FIG. 8A is a flowchart describing a method 800 for forming a panel having one or more cut lines according to an example. The method 800, in some implementations, begins with providing a first panel skin, a second panel skin, and a core material (810). The core material, in some examples, may include a foam core, a fiberglass core, or a polymer core. The core may include structured cells, such as a corrugated or honeycomb material.

In some implementations, an assembly is formed of the foam core in between the first panel skin and the second panel skin (812). In an example, the assembly is stacked, with or without additional bonding between layers. In another example, adhesives and/or an adhesive layer such as an adhesive film is added in between layers. Alternatively, the assembly can be mechanically or thermally bonded.

In some implementations, at least one reinforcement layer is placed in between the first/second panel skin and the foam core (814). Examples of the at least one reinforcement layer include reinforcement layers 260, 262 of FIG. 2E, 2F, 2I, or 2J. In other implementations, at least one of the first panel skin and the second panel skin can have the at least one reinforcement layer pre-assembled prior to forming the assembly.

In some implementations, the assembly is placed into a mold having a shape configured to form at least one cut line and a pair of grooves adjacent to the at least one cut line symmetrically in each of the first panel skin and the second panel skin (816). In an example, each cut line is spaced apart having a predetermined spacing such that when each cut line is cleaved, the panel is configured to have a new predetermined width. The one or more cut lines may be configured to allow a consumer to divide the panel into multiple segments along a panel width upon installation of the panel In other embodiments, the first panel skin and the second panel skin can have the one or more cut lines pre-formed prior to placement in the mold. Similarly, in further embodiments, the foam core can also be pre-formed with the one or more cut lines and configured to align with the one or more cut lines of the panel skins. For example, upon compression in the mold, the panel skins may be molded into the pre-formed cut lines of the core.

In some implementations, the mold to the assembly is compressed causing formation of the one or more cut lines into the assembly (818). In an example, compressing the mold to the assembly can further include providing heating/cooling to the assembly, a variable pressure, and simultaneous suction/vacuum. In an example, providing compression under vacuum can maintain positions of skin materials and/or assembly materials, thereby avoiding slippage, shifting, bunching, or folding of the materials. In an aspect, the twin sheet vacuum-formed process can improve fabrication time and reduce dimensional variation. However, other fabrication processes and methods known in the art may be used. For example, a panel can be made using two pre-molded skins and injection of foam material configured to fill space between the two pre-molded skins.

In some implementations, the panel is conditioned with a finishing treatment (820). In an example, the finishing treatment can include coating the panel in an insulative and/or finishing layer. In an example, the coating can be a dip coating and/or a spray coating. In an example, the finishing treatment can include thermal/heat-treating and/or heat-welding. In an aspect, the finishing treatment is configured to seal out moisture and bacteria. In an example, the finishing treatment can include trimming a portion of the resulting panel. In an example, the finishing treatment can include riveting portions of the skin to the filling material.

Figure 8B:
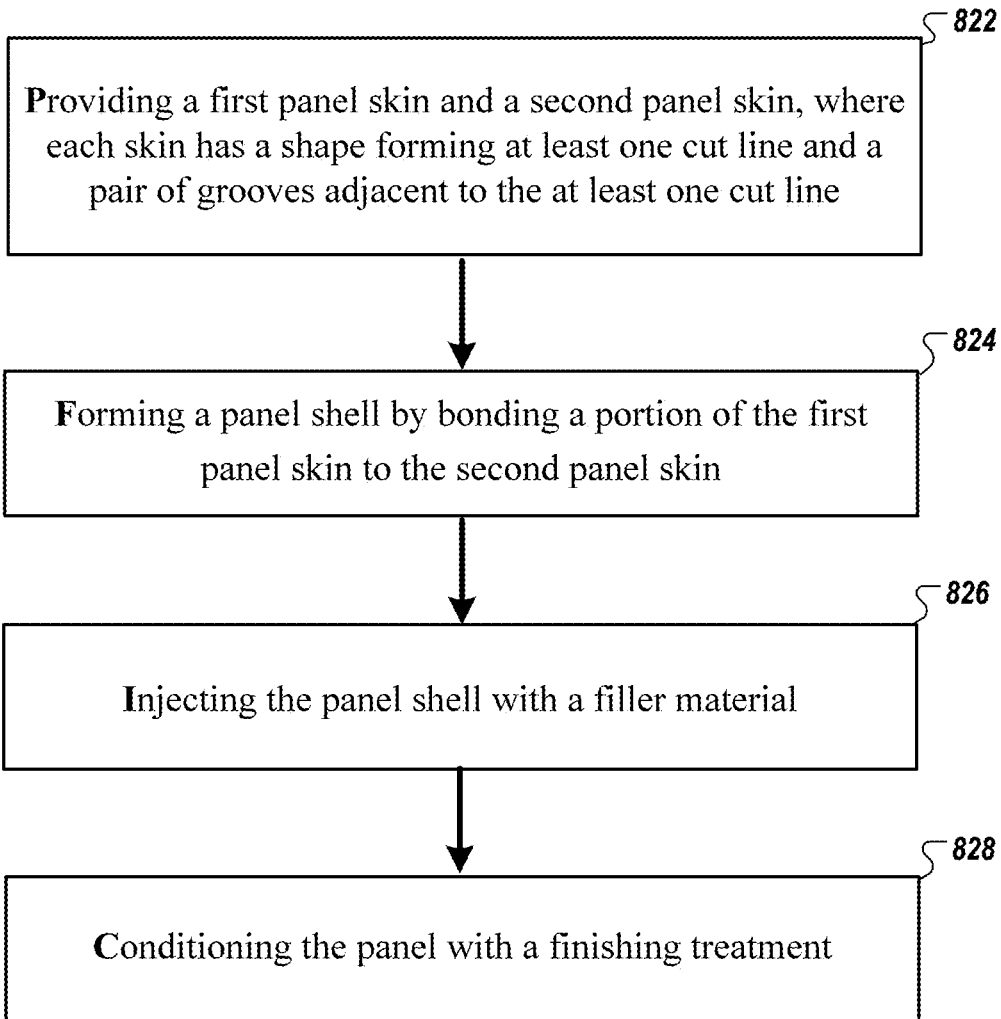

FIG. 8B is a flowchart describing a method 802 for forming a panel having one or more cut lines according to an example. In some implementations, the method 802 begins with providing a first panel skin and a second panel skin, where each skin has a shape configured to form at least one cut line and a pair of grooves adjacent to the at least one cut line and complementing each respective skin. (822). Each cut line may be configured to divide the panel into multiple segments along a panel width.

In some implementations, providing the panel skins having at least one cut line and a pair of grooves includes shaping each skin according to different scenarios. In an example, each skin may be placed into a mold having a shape configured to form the at least one cut line and the pair of grooves adjacent to the at least one cut line symmetrically in each of the skins. In another example, a shape of each skin may be formed by casting skin material over a cast configured to form the at least one cut line and the pair of grooves adjacent to the at least one cut line symmetrically in each of the skins. In another example, each skin may be vacuum formed into a shape configured to form the at least one cut line and the pair of grooves adjacent to the at least one cut line symmetrically in each of the skins.

In some implementations, a panel shell is formed by bonding a portion of the first panel skin to the second panel skin (824). In an example, the panel shell is formed by bonding all complementary sides of each skin, with exception of an inlet port and optionally an outlet port (not shown), whereby filling material can be introduced and air can be evacuated. In an example, a mechanical press can be used to deform and bond edges of the complementary sides of each skin, forming a tight junction. In an example, the tight junction is air tight, water tight, and/or sufficiently tight to restrict viscous filler material from leaking. In an aspect, the tight junction is configured to resist pressure from expanding foam from breaking the bond.

In some implementations, the panel can be filled with one or more filler materials, in one or more sections of the panel. In an example, a second type of filler material is used to fill the edges (212) of the panel, where a first type of material is used to fill the remaining portions of the panel. In an example, the second type of filler material can have a higher density than the first filler material. In an example, the second type of filler material can have an initial lower density than the first filler material, whereby the second type of filler material flows into smaller crevices and hardens. In an example, the second type of filler material can be applied to the edges of the panel prior to bonding of the skins to ensure these portions are filled.

In some implementations, the resulting hollow panel shell is injected with a filler material (826). In some embodiments, the panel shell is placed in a mold matching the shape of the panel skins during the injection. In an aspect, filling the panel shell within the mold can prevent ballooning of the skins under pressure of the injection. In some embodiments, the filler material includes closed cells (not shown). In an example, the filler material is an expandable aqueous agent or foam such as urethane insulation. In an example, the filler material is injected through the inlet port of the panel shell. In some implementations, any remaining portions of unbonded sides of the first panel skin and the second panel skin, such as the inlet/outlet ports, can be bonded and/or closed. In some implementations, after injection of the filler material, the filled assembly is allowed to settle and harden for a period of time. In some implementations, vacuum degassing and/or mechanical agitation can be applied to ensure pockets of air bubbles are removed.

In some implementations, at least one reinforcement layer can be placed in between the first/second panel skin prior to injecting the resulting panel shell with the filler material. Examples of the at least one reinforcement layer include reinforcement layers 260, 262. Details of the filler material are similar as mentioned in step 826. In some implementations, each reinforcement layer can be attached/adhered to each skin in an appropriate location prior to injection of the filler material. In some implementations, the panel can be conditioned with a finishing treatment (828). Details of the finishing treatment are similar as mentioned in step 820.

FIG. 8C is a flowchart describing a method 804 for forming a panel having one or more cut lines according to an example. In some implementations, the method 804 begins with providing a first panel skin and a second panel skin (830), and forming an assembly of the first panel skin and the second panel skin (832). In some implementations, the assembly may include aligning each panel skins according to fiber directions of the panel material to the direction of a mold. In some implementations, the assembly may include placing at least one reinforcement layer in between the first/second panel skin. Similar as mentioned above, each reinforcement layer can be attached/adhered to each skin in an appropriate location during assembly. In some embodiments, the at least one reinforcement layer contributes to forming the one or more cut lines into the assembly. In another example, the at least one reinforcement layer is pre-shaped and added to the shaped skins prior to injection with filler material.

In some implementations, the assembly is placed into a mold having a shape configured to form at least one cut line and a pair of grooves adjacent to the at least one cut line symmetrically in each of the first panel skin and the second panel skin (834). The mold, in some implementations, is compressed causing bonding of at least a portion of the first panel skin and the second panel skin and formation of the one or more cut lines into the assembly and a hollow core between the skins (836). In some embodiments, the mold includes one or more mold inserts to apply greater pressure and/or to separate portions of the skins. Heat may be applied, in some embodiments, before, during, and/or after compression to aim in bonding and/or forming the shaping of the skins. In an example, compressing the mold to the assembly can further include providing heating/cooling to the assembly, a variable pressure, and simultaneous suction/vacuum.

In some implementations, the resulting hollow core is injected with filler material (838). In some embodiments, the panel shell is held in the mold matching the shape of the panel skins during the injection. In an aspect, filling the panel shell within the mold can prevent ballooning of the skins under pressure of the injection. Details of the filler material are similar as mentioned in step 826 of FIG. 8B.

In some implementations, the panel is conditioned with a finishing treatment (840). Details of the finishing treatment are similar as mentioned in step 820.

Figure 8D:
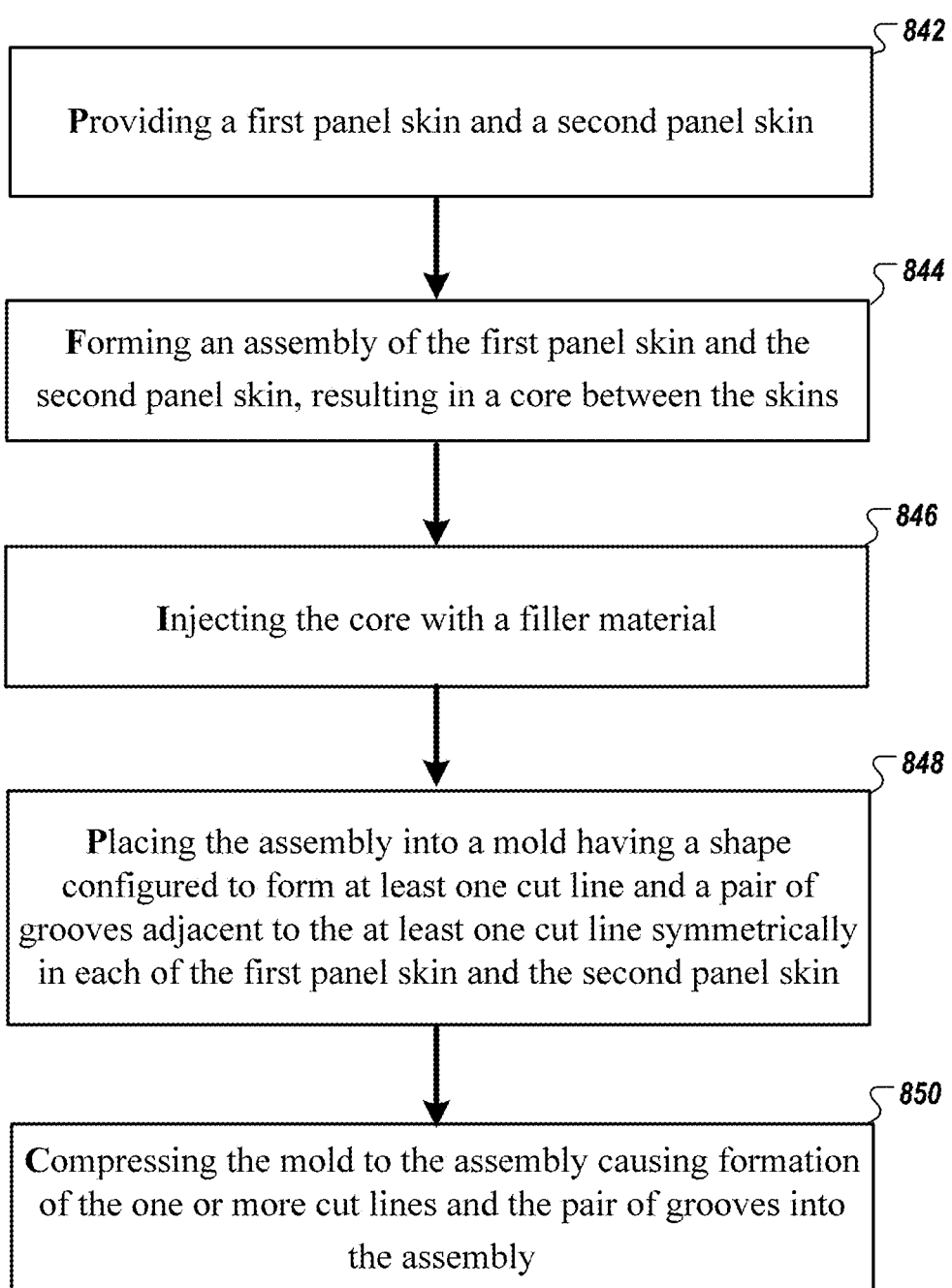

FIG. 8D is a flowchart describing a method 806 for forming a panel having one or more cut lines according to an example. in some implementations, the method 806 begins with providing a first panel skin and a second panel skin (842), and forming an assembly of the first panel skin and the second panel skin, resulting in a hollow core between the skins (844). In some embodiments, the hollow core can have one or more inlet/outlet ports. In some embodiments, at least one reinforcement layer can be placed in between the first/second panel skin during forming the assembly. Similar as mentioned above, each reinforcement layer can be attached/adhered to each skin in an appropriate location during assembly.

The resulting hollow core, in some implementations, is injected with filler material (846). Details of the filler material are similar as mentioned in step 826 of FIG. 8B. In some embodiments, the panel shell is placed in a mold matching the shape of the panel skins during the injection. In an aspect, filling the panel shell within the mold can prevent ballooning of the skins under pressure of the injection. In some embodiments, after injection of the filler material, the filled assembly is allowed to settle and harden for a period of time. In some embodiments, vacuum degassing and/or mechanical agitation can be applied to ensure pockets of air bubbles are removed. Next, in some implementations the assembly is placed into a mold having a shape configured to form at least one cut line and a pair of grooves adjacent to the at least one cut line symmetrically in each of the first panel skin and the second panel skin (848). The shapes of the cut lines and the grooves may be similar as shown in FIGS. 2A-2J, and 3A-3B.

In some implementations, the mold is compressed onto the assembly causing formation of the one or more cut lines and the pair of grooves into the assembly (850). In an example, compressing the mold to the assembly can further include providing heating/cooling to the assembly, a variable pressure, and simultaneous suction/vacuum. In some embodiments, excess filler material can exit the assembly from the one or more outlet ports formed within the assembly. Each outlet port can subsequently be sealed. In an example, the at least one reinforcement layer is also shaped during step 848 forming the one or more cut lines into the assembly. In some implementations, the panel can be conditioned with a finishing treatment similar as described in step 820 of FIG. 8B.

Installation

Installation of a number of panels, connected using a pair of complementary mating extrusions, forming the panel assembly for partitioning a trailer cargo space can be done according to several steps. As a first step, a measurement can be taken of the trailer cargo space according to an example. In an example, a first dimension of the trailer cargo space can be measured. In an example, the first dimension can be a length of the trailer cargo space and/or a height of the trailer cargo space where the panel assembly is to be installed. In an example, a second dimension of the trailer cargo space can be measured. In an example, the second dimension can be the height of the trailer cargo space, when the first dimension is the length, and/or the length of the trailer cargo space, when the first dimension is the height, where the panel assembly is to be installed.

Figures 9A, 9B, 9C:
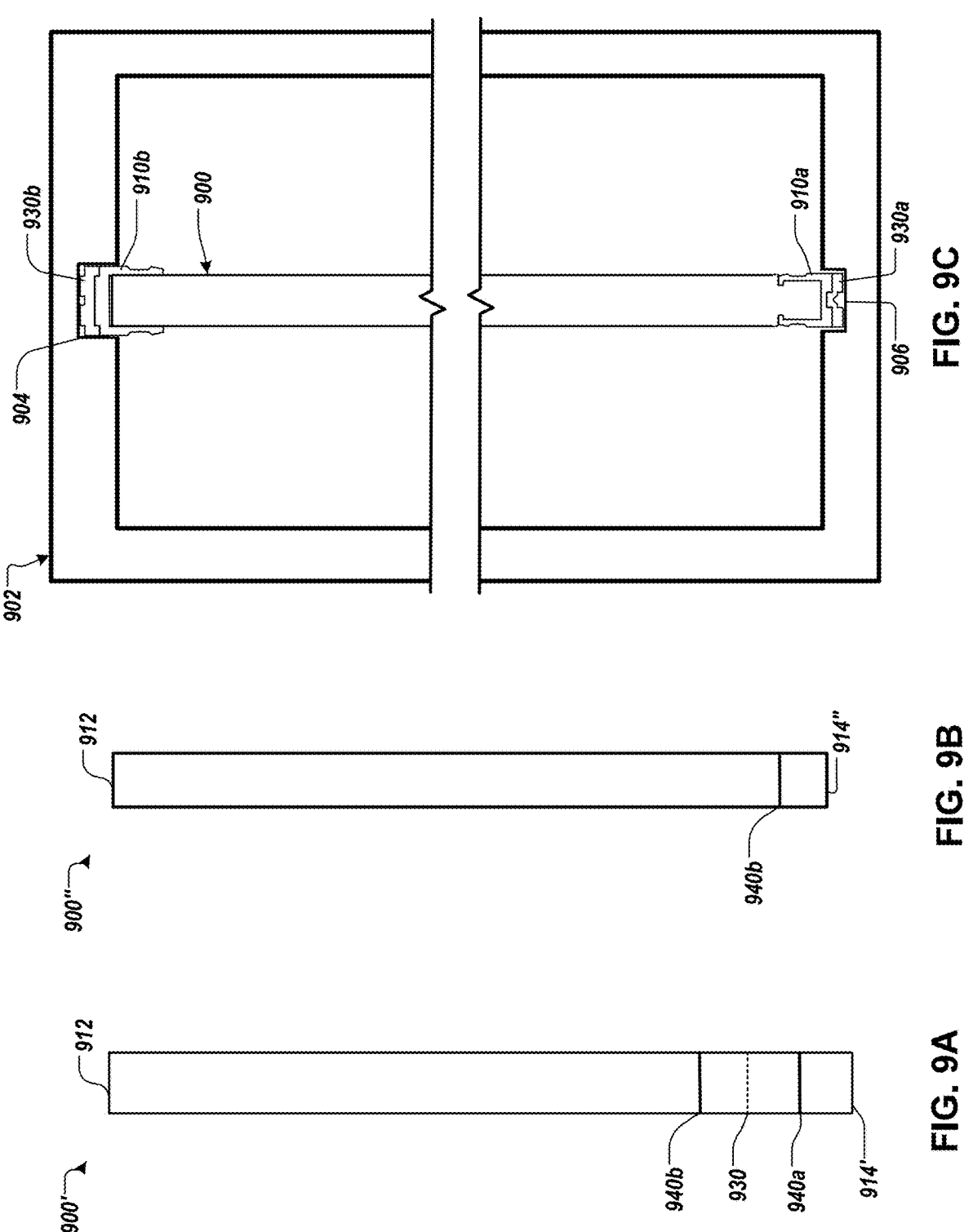
FIG. 9A is a drawing of a side view of a panel including a top edge, a connecting edge, a first groove proximate to the connecting edge, a cut line, and a second groove proximate to the cut line according to an example.
FIG. 9B is a drawing of a side view of the panel of FIG. 9A cut at the cut line forming a new connecting edge according to an example.
FIG. 9C is a drawing of a rear view of a trailer cargo space having a top channel and a bottom channel aligned with the top channel, and a panel secured within the top channel using the top extrusion assembled with the stacking plate of FIG. 6B and within the bottom channel using the bottom extrusion assembled with the stacking plate of FIG. 6A according to an example.

Turning to FIG. 9C, a rear view of a trailer cargo space 902 is shown having a top channel or groove 904 and a bottom channel or groove 906 aligned with the top channel or groove 904 according to an example. In an example, the first dimension can be a distance between the top channel or groove 904 and the bottom channel or groove 906.

Next, a first panel can be provided having a dimension corresponding to at least one of the first dimension and the second dimension. In an example, a panel can be provided having a cut line configured to substantially match at least one of the first dimension and the second dimension of the trailer cargo space. In an example, a panel can be provided having a cut line configured to substantially match a height of the trailer cargo space. In another example, a panel can be provided having a cut line configured to substantially match a remaining length of the trailer cargo space to complete the panel assembly or the insulated wall. In an example, the first panel can be a panel 900 (FIG. 9A) having a top edge 912, a connecting edge 914', one or more horizontal cut lines 930 proximate to a vertical edge of the panel 900, where when each horizontal cut line 930 is cut, a new connecting edge 914" is formed at the edge formed by the severed cut line 930, thereby adjusting a height the panel 900' or forming panel 900" (FIG. 9B). In an example, the panel 900 can include one or more grooves 940a-b proximate either an edge of the panel 900 or each horizontal cut line 930. In an example, the groove 940a of the panel 900' can be connected to the bottom extrusion 610a (FIG. 6A). In an example, the groove 940b of the panel 900" can be connected to the bottom extrusion 610a.

With an appropriate first panel provided, the first panel can be cut at a respective cut line. In an example, the panel 900' can be cut at the cut line 930 resulting in a cut panel 900" as shown in FIG. 9B. In an example, the panel can be cut using a band saw or a cutting jig. In an aspect, the band saw or the cutting jig can have a saw blade having a width that facilitates a straight and symmetrical severance of the panel at the cut line. In an example, the saw blade can be configured to have a width substantially matching the shape of the cut line. In an example, the first panel may not require cutting and can be installed to form the panel assembly with another cut panel.

Next, a first extrusion, at least one of a bull shaped extrusion 410a-b (FIGS. 4A-4B) and an H-shaped extrusion 450a-c (FIGS. 4C-4E), can be connected to the first panel according to an example. In an example, the first extrusion can be slid on a first lateral edge of the first panel by aligning the guides 424a-b, 464a-b (FIGS. 4A-4E) of the first extrusion to the grooves 250 (FIGS. 2D-2J) of the first panel. In another example, the first extrusion can be snapped onto the first lateral edge of the first panel. In an example, a fastener can be used to secure the first extrusion to the first panel. The first panel can be installed within a channel or groove 150, 152 (FIG. 1) of the trailer cargo space where a second lateral edge of the first panel is secured to a wall of the trailer cargo space and where the first lateral edge connected to the first extrusion is prepared to connect to another panel. A second extrusion, complementing the first extrusion, can be connected to a first lateral edge of the next panel and a third extrusion can be connected to a second lateral edge of the next panel according to an example. The second panel can be installed within the channel of the trailer cargo space, where the second extrusion is mated to the first extrusion connected to the first panel.

In some implementations, each panel of the panel assembly can be fitted with at least one of a top extrusion and a bottom extrusion to accommodate a measured height of the trailer cargo space. In an example, a bottom extrusion 910a (e.g., 610a of FIG. 6A) can be secured to a bottom edge of the first panel and installed within the bottom channel or groove 906 (e.g., 150 of FIG. 1) of the trailer cargo space 902. In an example, the bottom extrusion 910a can be slid on a bottom edge of the first panel by aligning the guides 624

(FIG. 6A) of the bottom extrusion to the grooves 250 (FIGS. 2D-2J) of the bottom edge of the first panel. In some implementations, a stacking plate 930*a* (e.g., 630*a* of FIG. 6A) can be secured to the bottom extrusion 910*a* and then placed within the channel or groove 906 of the trailer cargo space 902. In some implementations, a top extrusion 910*b* (e.g., 610*b* of FIG. 6*b*, 700 of FIG. 7A) can be either connected to a top channel or groove 904 (e.g., 152 of FIG. 1) on the ceiling of the trailer cargo space or to a top edge of the first panel. In some implementations, a stacking plate 930*b* (e.g., 630*b* of FIG. 6*b*, 702 of FIG. 7B) can be secured to the top extrusion 910*b* and then placed within the top channel or groove 906 of the trailer cargo space 902. In an example, a fastener can be secured at the groove of the stacking plate 930*b* to connect the stacking plate 930*b* to the top extrusion 910*b*.

With the first panel installed, at least one next panel can be provided and cut at a cut line as needed. In an example, multiple next panels can be installed to form the panel assembly. In an example, the next panel may not require cutting. In some implementations, the next panel can be cut at a cut line such that a combination of the first panel, the next panel, and the mating extrusions are configured to form a panel assembly substantially matching the measured dimension of the length of the trailer cargo space.

Figures 10A, 10B:
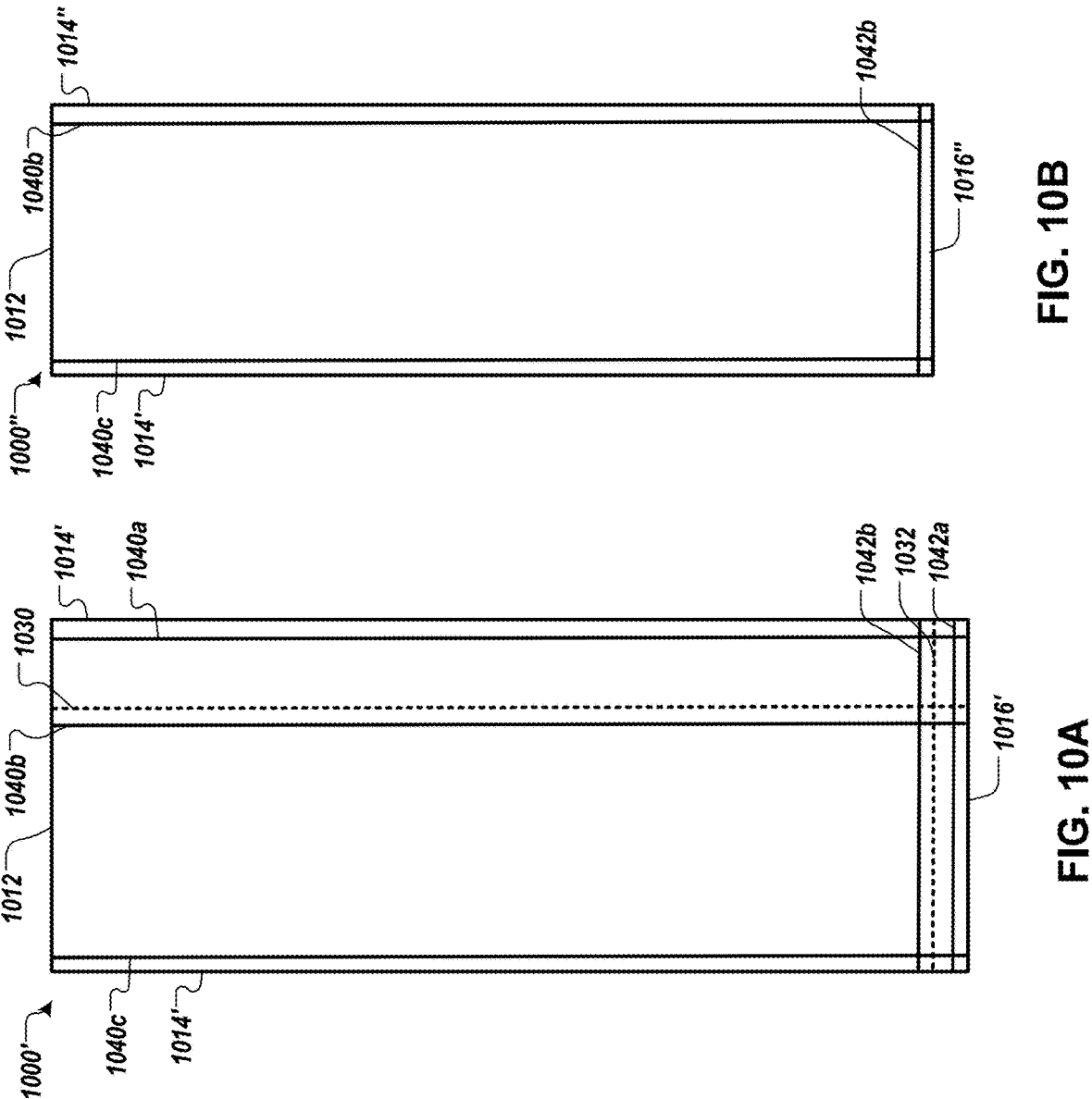
FIG. 10A is a drawing of a panel having at least one vertical cut line proximate to a lateral connecting edge, a first vertical groove proximate to the lateral connecting edge, a second vertical groove proximate to the at least one vertical cut line, at least one horizontal cut line proximate to a bottom connecting edge, a first horizontal groove proximate to the bottom connecting edge, and a second horizontal groove proximate to the at least one horizontal cut line according to an example.
FIG. 10B is a drawing of the panel of FIG. 10A cut at the at least one vertical cut line and cut at the least one horizontal cut line, where the cut at least one vertical cut line forms a new lateral connecting edge, and where the cut at least one horizontal cut line forms a new bottom connecting edge according to an example.
Figure 10C:
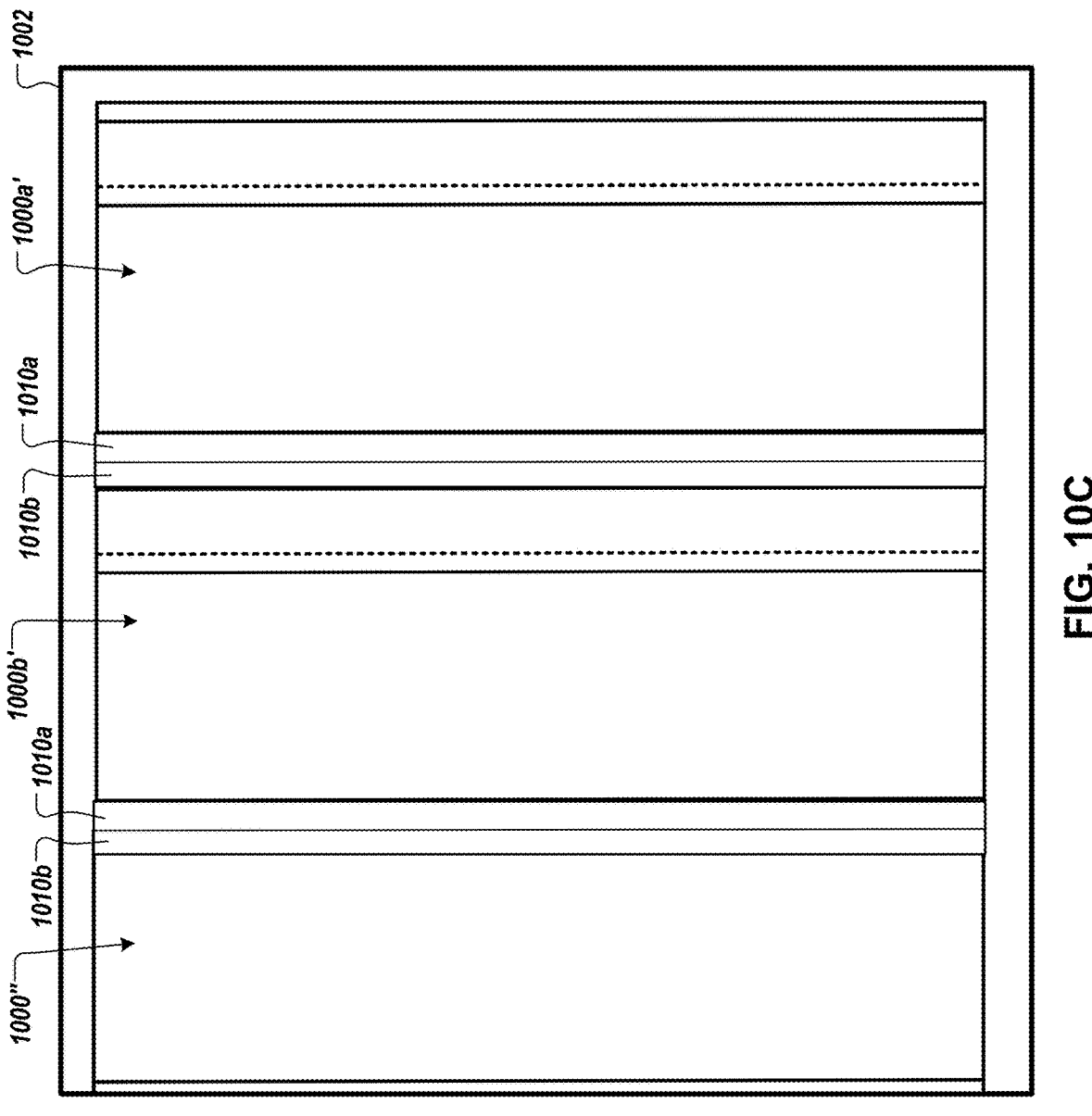
FIG. 10C is a drawing of a side view of a trailer cargo space having a top channel and a bottom channel extending along a length of the trailer cargo space, and a panel assembly including a number of panels secured to each other using the extrusions shown in FIGS. 4A-4D according to an example.

Turning to FIGS. 10A-10C, a panel assembly forming a center wall is shown formed along a length of a trailer cargo space 1002. FIG. 10A is a drawing of a panel 1000' having at least one vertical cut line 1030 proximate to a lateral connecting edge 1014', a first vertical groove 1040*a* proximate to the lateral connecting edge 1014', a second vertical groove 1040*b* proximate to the at least one vertical cut line 1030, at least one horizontal cut line 1032 proximate to a bottom connecting edge 1016', a first horizontal groove 1042*a* proximate to the bottom connecting edge 1016', and a second horizontal groove 1042*b* proximate to the at least one horizontal cut line 1032 according to an example. FIG. 10B is a drawing of a cut panel 1000N, the panel 1000' of FIG. 10A cut at the at least one vertical cut line 1030 and cut at the least one horizontal cut line 1032, where the cut at the at least one vertical cut line 1030 forms a new lateral connecting edge 1014", and where the cut at least one horizontal cut line 1032 forms a new bottom connecting edge 1016" according to an example.

FIG. 10C is a drawing of a side view of the trailer cargo space 1002 having a top channel and a bottom channel extending along the length of the trailer cargo space 1002, and a panel assembly including a number of panels secured to each other using complementary extrusions 1010*a-b* (410*a-b*, 450*a-c*) according to an example. In an example, a first panel 1000*a'* can be installed and a first extrusion 1010*a* can be connected to a first lateral edge of the first panel 1000*a'*. A second extrusion 1010*b*, complementing the first extrusion 1010*a*, can be connected to a first lateral edge of a next panel 1000*b'* and a third extrusion 1010*a* can be connected to a second lateral edge of the next panel 1000*b'* according to an example. To complete a center panel wall, a second extrusion 1010*b*, complementing the first extrusion 1010*a*, can be connected to a first lateral edge of a last panel 1000" (panel 1000). The last panel 1000" is shown to make the center panel wall match the length of the trailer cargo space. However, one or more of any one of the first panel, the next panel, and the last panel can be cut to form a center panel wall matching the length of the trailer cargo space.

In an aspect, more than one panel of the panel assembly can be cut to accommodate differently sized trailer cargo spaces. In an example, two or more panels of the panel assembly can be cut at different cut lines such that an assembly of the severed two or more panels is configured to make the center panel wall match the length of the trailer cargo space. In an example, a distribution of cut lines within a first panel can be different than a distribution of cut lines within a next panel and/or last panel. In some implementations, the panel assembly can be assembled with more or more traditional panels without cut lines and at least one panel having at least one cut line configured to be cut to make the center panel wall match the length of the trailer cargo space.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An apparatus for attachment to a panel configured for use in partitioning a cargo space of a trailer, the apparatus comprising:

an extruded member having a cross-section comprising a concave receiver section comprising a laterally extending support section connected to a pair of spaced apart sidewalls configured to extend substantially perpendicular to the laterally extending support section, the concave receiver section dimensioned to allow attachment of the extruded member along an edge of an insulated panel with the pair of sidewalls engaged against opposite sides of the insulated panel and the laterally extending support section having a panel-facing surface in contact with an edge surface of the edge of the insulated panel, and one or more first mechanical engagement features disposed opposite the panel-facing surface of the laterally extending support section, the one or more first mechanical engagement features configured to extend along an edge surface of the panel assembly; and a first extruded stacking plate having a cross-section comprising a first side having one or more complementary features with a complementary shape to the one or more first mechanical engagement features, such that, in a first potential assembly, the extruded member and the first extruded stacking plate mate substantially along the shared length of the extruded member and the first extruded stacking plate, with the one or more complementary features of the first extruded stacking plate engaged with the one or more first mechanical engagement features of the extruded member, and a second side, opposite the first side, with one or more second mechanical engagement features substantially identical to the one or more first mechanical engagement features of the extruded member, such that, in a second potential assembly, the first extruded stacking plate mates with a second extruded stacking plate substantially along the shared length of the extruded member and the first extruded staking place, with the one or more second mechanical engagement features of the first extruded stacking plate engaged with the one or more complementary features of the second extruded stacking plate.

2. The apparatus of claim 1, further comprising the insulated panel, the insulated panel combined with the extruded member and the first extruded stacking plate to form the panel assembly, wherein the extruded member attaches around an edge of the insulated panel and the first extruded stacking plate attaches to the extruded member along the edge of the insulated panel, the first extruded stacking plate of the panel assembly is configured to engage with a channel of the trailer cargo space to form a partition wall section within the trailer cargo space, the engagement of the channel and the first extruded stacking plate assisting in maintaining a position of the partition wall section within the trailer cargo space.

3. The apparatus of claim 2, further comprising the second extruded stacking plate joined over the first extruded stacking plate of the panel assembly, such that the second extruded stacking plate instead of the first extruded stacking plate is configured to engage with the channel of the trailer cargo space.

4. The apparatus of claim 1, wherein each sidewall of the pair of sidewalls of the extruded member comprises, within the concave receiver section, a respective flange configured to mate with a respective complimentary groove on a respective side of and paralleling an edge of the insulated panel.

5. The apparatus of claim 1, wherein the second side of the first extruded stacking plate comprises at least one aperture to receive at least one fastener to attach the first extruded stacking plate to the extruded member in the first potential assembly, and to attach the first extruded stacking plate to the second extruded stacking plate in the second potential assembly.

6. The apparatus of claim 5, wherein the at least one aperture comprises a groove formed along a length of the first extruded stacking plate, the groove configured to allow, upon attaching the first extruded stacking plate in the first potential assembly, a top surface of each fastener of the at least one fastener to align at or below an outermost surface of the second side of the first extruded stacking plate.

7. The apparatus of claim 1, wherein the extruded member comprises a set of flexible sealing flaps attached to the laterally extending support section so as to extend laterally from opposing sides of the extruded member, substantially along a length of the extruded member.

8. The apparatus of claim 7, wherein the set of flexible sealing flaps of the extruded member are configured to assist, upon installation of the extruded member within a channel, in creating an insulating seal for the insulated panel having the extruded member attached.

9. The apparatus of claim 1, wherein the first extruded stacking plate comprises a set of flexible sealing flaps attached to the first extruded stacking plate so as to extend laterally from opposing sides of the first extruded stacking plate, substantially along a length of the first extruded stacking plate.

10. The apparatus of claim 9, wherein the set of flexible sealing flaps of the first extruded stacking plate are configured to assist, upon installation of the first extruded stacking plate within a channel of a trailer cargo space, in creating an insulating seal for the insulated panel having the first extruded stacking plate attached.

11. The apparatus of claim 10, wherein creating the insulating seal comprises one or both of the set of flexible sealing flaps deforming against the channel so as to inhibit airflow from one side of the insulated panel to the other side.

12. The apparatus of claim 1, wherein the laterally extending support section of the extruded member comprises an inner frame, an outer frame, and at least one support disposed between the inner frame and the outer frame.

13. The apparatus of claim 12, wherein each support of the at least one support is configured to provide, under compressive force, a deformable separation distance between the inner frame and the outer frame with, for at least some deformable separation distances, a restoration force resisting the compressive force.

14. The apparatus of claim 1, wherein the first extruded stacking plate comprises an inner frame defining one or more of the one or more complementary features, an outer frame defining at least one of the one or more second mechanical engagement features, and at least one support disposed between the inner frame and the outer frame.

15. The apparatus of claim 14, wherein each support of the at least one support is configured to provide, under compressive force, a deformable separation distance between the inner frame and the outer frame with, for at least some deformable separation distances, a restoration force resisting the compressive force.

16. The apparatus of claim 1, wherein the sidewalls of the extruded member each comprise a thinned cross-sectional wall portion extending substantially along a length of that sidewall, wherein the thinned cross-sectional wall portion is configured to increase flexibility of a distal section of that sidewall.

17. The apparatus of claim 1, wherein one or more of the one or more complementary features of the first extruded stacking plate interlock with one or more of the one or more first mechanical engagement features of the extruded member, wherein interlocking of the first extruded stacking plate and the extruded member is facilitated by sliding the first extruded stacking plate from one end onto the extruded member.

18. The apparatus of claim 17, wherein interlocking features of the one or more first mechanical engagement features of the extruded member and the one or more complementary features of the first extruded stacking plate comprise one or more channels and one or more ribs that engage with the one or more channels.

19. The apparatus of claim 1, wherein the one or more first mechanical engagement features of the extruded member and the one or more complementary features of the first extruded stacking plate comprise a tongue and a groove.

* * * * *